(12) United States Patent
Onishi et al.

(10) Patent No.: US 6,577,356 B2
(45) Date of Patent: Jun. 10, 2003

(54) PLASMA ADDRESSED LIQUID CRYSTAL DISPLAY DEVICE AND METHOD FOR FABRICATING THE SAME

(75) Inventors: Noriaki Onishi, Nara (JP); Aya Miyazaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 108 days.

(21) Appl. No.: 09/730,743

(22) Filed: Dec. 7, 2000

(65) Prior Publication Data

US 2003/0020843 A1 Jan. 30, 2003

(30) Foreign Application Priority Data

Dec. 8, 1999 (JP) ............................. 11-349350
Dec. 8, 1999 (JP) ............................. 11-349351

(51) Int. Cl.$^7$ ............................................. G02F 1/133
(52) U.S. Cl. ............................. 349/32; 349/123; 349/93
(58) Field of Search ...................... 349/32, 123, 93, 349/96, 106, 108, 137, 139, 156

(56) References Cited

U.S. PATENT DOCUMENTS 5,914,761 A * 6/1999 Ohe et al. .................. 349/132
6,147,721 A * 11/2000 Tanaka et al. ................ 349/32
6,344,370 B1 * 2/2002 Izumi et al. .................. 438/97
6,344,883 B2 * 2/2002 Yamada et al. ............... 349/32

FOREIGN PATENT DOCUMENTS

| JP | 09-197384 | 7/1997 |
| JP | 10-148835 | 6/1998 |
| JP | 10-186330 | 7/1998 |
| JP | 10-186331 | 7/1998 |
| JP | 10-239671 | 9/1998 |
| JP | 11-072793 | 3/1999 |

* cited by examiner

Primary Examiner—Robert H. Kim
Assistant Examiner—Thoi V Duong
(74) Attorney, Agent, or Firm—Nixon & Vanderhye P.C.

(57) ABSTRACT

The liquid crystal display (LCD) device of the invention includes: a substrate; a dielectric layer; a liquid crystal layer sandwiched by the substrate and the dielectric layer; a plurality of stripe-shaped electrodes formed on a surface of the substrate facing the liquid crystal layer to extend in parallel with a first direction; and a plurality of stripe-shaped plasma channels formed to face the plurality of electrodes with the liquid crystal layer and the dielectric layer therebetween to extend in parallel with a second direction different from the first direction. The dielectric layer or an alignment layer formed on a surface of the dielectric layer facing the liquid crystal layer selectively attenuates ultraviolet rays emitted from the plasma channels.

24 Claims, 10 Drawing Sheets

FIG. 5A
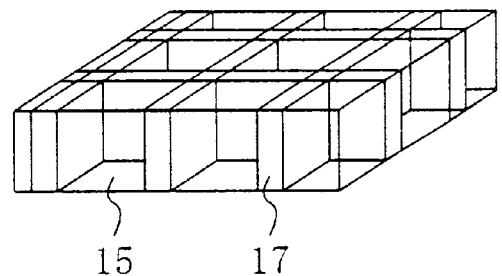
FIG. 5C
FIG. 5B
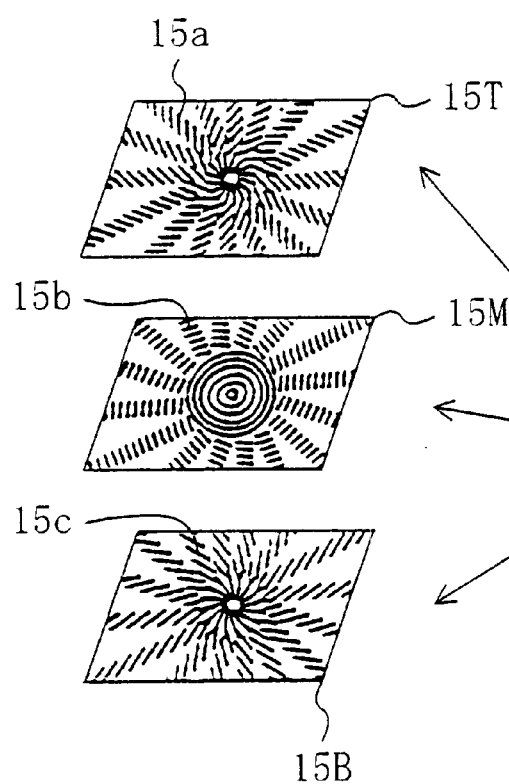
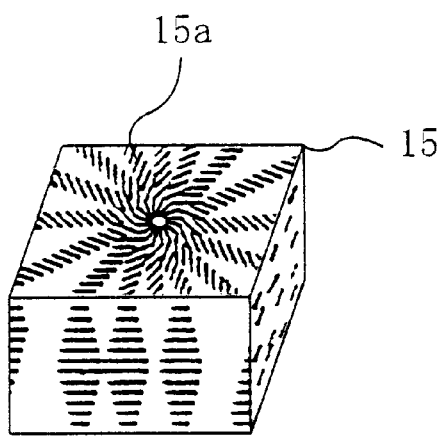

PLASMA ADDRESSED LIQUID CRYSTAL DISPLAY DEVICE AND METHOD FOR FABRICATING THE SAME

BACKGROUND OF THE INVENTION

The present invention relates to a liquid crystal display device and a method for fabricating the same, and more particularly, to a plasma addressed liquid crystal display device and a method for fabricating the same.

Development of plasma addressed liquid crystal display (LCD) devices is in progress for realization of large and thin flat displays. Plasma addressed LCD devices are liquid crystal display devices using a plasma cell for switching respective pixels. Size increase of this type of devices is easier compared with active matrix LCD devices using thin film transistors (TFTs), and therefore fabrication at low cost is possible. Plasma addressed LCD devices are disclosed in Japanese Laid-Open Patent Publication No. 1-217396 and No. 4-265931, for example.

A large problem to be overcome on plasma addressed LCD devices is that long-time maintenance of display quality is difficult. Plasma addressed LCD devices display images in the following manner. Plasma channels arranged in row are filled with ionizable discharge gas. Discharge plasma is generated in the plasma channels, to scan the plasma channels line-sequentially. In synchronization with this scanning, a voltage is applied to signal electrodes arranged in columns. In general, a plasma addressed LCD device emits ultraviolet rays during generation of discharge plasma. The emitted ultraviolet rays may degrade organic materials constituting a liquid crystal cell, such as liquid crystal molecules and alignment layers. By this degradation, the voltage retention decreases, for example, causing troubles such as local display exudation (irreversible display failure, indicating that the contrast ratio changes) and after-image (reversible display failure, also called "image burn-in"). This lowers the display quality of the LCD device.

In order to solve the above problem, Japanese Laid-Open Patent Publication No. 10-239671 discloses a plasma addressed LCD device that includes an ultraviolet transmission preventing layer formed on a sheet glass to prevent ultraviolet rays from a plasma cell from entering a liquid crystal cell.

There has been reported a technique of controlling the orientation of liquid crystal molecules by use of ultraviolet radiation for the purpose of improving the viewing angle characteristics of an LCD device. For example, Japanese Laid-Open Patent Publication No. 9-197384 discloses a plasma addressed LCD device of an axially symmetrically aligned micro-cell (ASM) mode that utilizes ultraviolet radiation during aligning processing. In the technique disclosed in this publication, ultraviolet rays including i-line (wavelength: 365 nm) are radiated from outside a plasma cell for stabilizing axially symmetrical orientation of liquid crystal molecules in the ASM mode LCD device.

Japanese Laid-Open Patent Publication No. 10-87859 discloses a technique of controlling the alignment direction (direction in which liquid crystal molecules are aligned) of an alignment film by irradiating the alignment film with linearly polarized ultraviolet rays. Japanese Laid-Open Patent Publication No. 10-148835 discloses a technique where a specific position of an alignment film is selectively irradiated with ultraviolet rays, to thereby selectively change the pretilt angle of liquid crystal molecules at the irradiated position and thus to widen the viewing angle.

SUMMARY OF THE INVENTION

The object of the present invention is providing a plasma addressed liquid crystal display device having wide viewing angle characteristics that can suppress or prevent deterioration in display quality due to ultraviolet rays from plasma channels and also can perform aligning processing using ultraviolet rays in a specific wavelength band, and a method for fabricating the plasma addressed liquid crystal display device.

The above object is attained by liquid crystal display devices of the first and second embodiments and the methods for fabricating the liquid crystal display devices, which are to be described below. The liquid crystal display device of the first embodiment of the invention includes: a substrate; a dielectric layer; a liquid crystal layer sandwiched by the substrate and the dielectric layer; a plurality of stripe-shaped electrodes formed on a surface of the substrate facing the liquid crystal layer to extend in parallel with a first direction; and a plurality of stripe-shaped plasma channels formed to face the plurality of electrodes with the liquid crystal layer and the dielectric layer therebetween to extend in parallel with a second direction different from the first direction, a plurality of pixel regions being formed in respective crossings of the plurality of electrodes and the plurality of plasma channels, wherein the dielectric layer selectively attenuates ultraviolet rays emitted from the plurality of plasma channels.

The dielectric layer of the LCD device of the first embodiment of the invention selectively attenuates ultraviolet rays emitted from the plurality of plasma channels. Accordingly, the dielectric layer can suppress or prevent organic materials such as liquid crystal molecules and alignment layers constituting a liquid crystal cell from degrading due to ultraviolet rays having a specific wavelength emitted by plasma discharge during use, and yet can transmit ultraviolet rays in other ranges. It is therefore possible to perform aligning processing and the like using ultraviolet rays allowed to pass through the dielectric layer.

Japanese Laid-Open Patent Publication No. 10-239671 mentioned above does not expect the case of positively utilizing ultraviolet rays, and thus does not disclose the idea of providing the ultraviolet transmission preventing layer with the function of transmitting ultraviolet rays in a specific wavelength range. Therefore, it is not possible to adopt the technique of controlling the alignment of liquid crystal molecules under ultraviolet radiation disclosed in Japanese Laid-Open Patent Publication No. 9-197384 mentioned above, for the fabrication of the plasma addressed LCD device having the ultraviolet transmission prevention layer disclosed in Japanese Laid-Open Patent Publication No. 10-239671 mentioned above.

The wavelength of the ultraviolet rays selectively attenuated by the dielectric layer is set depending on the plasma channels used. For example, it is set depending on the conditions of sealed discharge gas such as the kind and/or the pressure thereof. The wavelength of the ultraviolet rays allowed to pass through the dielectric layer may be appropriately set depending on the ultraviolet rays used in the fabrication process of the plasma addressed LCD device.

The expression of "attenuating ultraviolet rays" as used herein means attenuating the intensity of incident ultraviolet rays by "absorbing" or "scattering" the ultraviolet rays.

The dielectric layer may be formed of a single dielectric sheet having a property of selectively attenuating the ultraviolet rays. By adopting the dielectric layer formed of a single dielectric sheet having a property of selectively attenuating the ultraviolet rays emitted from the plasma channels, no separate ultraviolet-blocking layer is required for selective ultraviolet attenuation. This simplifies the fabrication process, that is, reduces the number of fabrication steps. This also prevents possible occurrence of peeling off at the interface between such a separate ultraviolet-blocking layer and the dielectric sheet. As a result, a reliable plasma addressed LCD device is provided.

The dielectric layer may include a dielectric sheet transmitting the ultraviolet rays and an ultraviolet-blocking layer formed on at least one surface of the dielectric sheet, and the ultraviolet-blocking layer may have a property of selectively attenuating the ultraviolet rays. Some ultraviolet-blocking materials may not be easily processed into a single dielectric sheet. Such ultraviolet-blocking materials are made usable by adopting the dielectric layer including a dielectric sheet such as a glass sheet transmitting the ultraviolet rays and an ultraviolet-blocking layer having a property of selectively attenuating the ultraviolet rays. Naturally, ultraviolet-blocking materials that can be easily processed into a single dielectric sheet may be used.

Preferably, the ultraviolet-blocking layer includes inorganic particulates that attenuate the ultraviolet rays. By forming the ultraviolet-blocking layer including inorganic particulates that attenuate the ultraviolet rays emitted from the plasma channels, selection of the wavelength of ultraviolet rays to be attenuated is easy. That is, the band gap of inorganic particulates can be easily controlled by appropriately selecting the compound. It is therefore possible to control the properties of the ultraviolet-blocking layer so that the layer selectively attenuates ultraviolet rays having a desired wavelength while transmitting ultraviolet rays in other wavelength ranges. Since the ultraviolet-blocking layer including such inorganic particulates is formed on the dielectric sheet made of sheet glass, it also serves as a hard coat layer protecting the dielectric sheet from being damaged in the process of bonding a plasma channel-side substrate with a color filter-side substrate, the process of injecting a liquid crystal material, and the like.

The ultraviolet-blocking layer may include an ultraviolet absorbent and/or a photostabilizer. When an organic material is used to form the ultraviolet-blocking layer, in particular, both an ultraviolet absorbent and a photostabilizer are preferably used. If only the ultraviolet absorbent is used, degradation of the liquid crystal molecules or the alignment layers may not be sufficiently prevented. To state in more detail, various radicals are produced by absorption of ultraviolet rays by the ultraviolet absorbent. The produced radicals may react with the organic materials such as the liquid crystal molecules and the alignment layers constituting the liquid crystal cell, possibly resulting in degrading the organic materials. The photostabilizer captures the produced radicals, and thus can prevent the organic materials constituting the liquid crystal cell from reacting with the radicals and thus degrading. The ultraviolet-blocking layer including the ultraviolet absorbent and the photostabilizer serves as a hard coat layer preventing damage of the dielectric layer, as the ultraviolet-blocking layer including inorganic particulates does as described above. The voltage applied between the electrodes of the liquid crystal cell and the plasma channels is capacitance-divided. A divided voltage is therefore applied across the liquid crystal layer of the plasma addressed LCD device. By the addition of the ultraviolet-blocking layer between the plasma channels and the liquid crystal layer, the voltage applied across the liquid crystal layer is reduced. If the voltage is reduced to 95% or less of the case having no ultraviolet-blocking layer, decrease in contrast ratio is eminent. Preferably, $Z_f$ is 20% or less of $Z_g$ when $Z_f$ is $d_f/\in_f$ and $Z_g$ is $d_g/\in_g$ where $d_f$ and $\in_f$ are the thickness and the dielectric constant of the ultraviolet-blocking layer, and $d_g$ and $\in_g$ are the thickness and the dielectric constant of the dielectric sheet. By this setting, the voltage applied across the liquid crystal layer is prevented from decreasing to 95% or less of the case having no ultraviolet-blocking layer. Thus, reduction in display brightness and contrast ratio can be suppressed or prevented. Typically, the thickness of the ultraviolet-blocking layer $d_f$ is 3 μm or less. By this setting, a sufficient voltage can be applied across the liquid crystal layer.

The ultraviolet transmittance of the dielectric layer is preferably 70% or less for a wavelength range of 340 nm or less and 80% or more for a wavelength of 365 nm.

Preferably, the liquid crystal layer includes liquid crystal molecules and a cured ultravioletcurable resin, and the initial orientation of the liquid crystal molecules is stabilized by the cured ultravioletcurable resin.

Further preferably, the LCD device further includes a wall structure on the surface of the substrate facing the liquid crystal layer, the liquid crystal layer is divided into a plurality of liquid crystal regions by the wall structure, and the liquid crystal molecules in the liquid crystal regions are axially symmetrically oriented. In the ASM mode LCD device that further includes such a wall structure on the surface of the substrate facing the liquid crystal layer, the refractive index anisotropy of the liquid crystal molecules is averaged over all the azimuthal directions. This solves the conventional problem that the viewing angle characteristics greatly differ depending on the azimuthal direction, which is observed in the gray scale display in the conventional twisted nematic (TN) mode LCD device. The resultant LCD device has wide viewing angle characteristics. The dielectric layer of the LCD device of the invention sufficiently transmits ultraviolet rays in a specific wavelength as described above. It is therefore possible to execute ultraviolet radiation via the plasma cells for stabilizing initial axially symmetrical orientation of the liquid crystal molecules in the fabrication process of the ASM mode plasma addressed LCD device.

Ultraviolet radiation may also be performed, not only in the fabrication process of the ASM mode plasma addressed LCD device described above, in a process after cell assembly, such as a process of changing the pretilt angle by irradiating an alignment layer with ultraviolet rays (see Japanese Laid-Open Patent Publication No. 10-148835, for example).

The method for fabricating the liquid crystal display device of the first embodiment of the invention is a method for fabricating a liquid crystal display device including: a substrate; a dielectric layer; a liquid crystal layer sandwiched by the substrate and the dielectric layer; a plurality of stripe-shaped electrodes formed on a surface of the substrate facing the liquid crystal layer to extend in parallel with a first direction; and a plurality of stripe-shaped plasma channels formed to face the plurality of electrodes with the liquid crystal layer and the dielectric layer therebetween to extend in parallel with a second direction different from the first direction, a plurality of pixel regions being formed in respective crossings of the plurality of electrodes and the plurality of plasma channels, the device further comprising a wall structure on the surface of the substrate facing the liquid crystal layer, the liquid crystal layer being divided into a plurality of liquid crystal regions by the wall structure, the liquid crystal molecules in the liquid crystal regions being axially symmetrically oriented. The method includes the steps of: forming the wall structure on the substrate; preparing the dielectric layer that selectively attenuates ultraviolet rays emitted from the plurality of plasma channels; injecting a material including liquid crystal molecules and an ultravioletcurable resin in a space between the substrate on which the wall structure is formed and the dielectric layer; and stabilizing initial orientation of the liquid crystal molecules by irradiating the material with ultraviolet rays having a wavelength of 365 nm via the dielectric layer to cure the ultravioletcurable resin.

According to the above method, a material including liquid crystal molecules and an ultravioletcurable resin is injected into a space between the substrate on which the wall structure is formed and the dielectric layer. Then, the material is irradiated with ultraviolet rays having a wavelength of 365 nm via the dielectric layer to cure the ultravioletcurable resin, whereby initial orientation of the liquid crystal molecules is stabilized. As a result, it is possible to fabricate an ASM mode LCD device that can prevent deterioration in the display quality of the liquid crystal cell due to ultraviolet radiation during use. In particular, the present invention is effective for plasma addressed LCD devices for color display for the following reason. A color plasma addressed LCD device includes a color filter layer formed on the substrate of the liquid crystal cell. The color filter layer generally absorbs ultraviolet rays, and thus blocks sufficiently intense ultraviolet rays from entering the liquid crystal layer via the liquid crystal cell. Therefore, for fabrication of an LCD device that necessitates ultraviolet radiation to the liquid crystal layer, such as an ASM mode color plasma addressed LCD device, the method according to the present invention is advantageous because ultraviolet radiation to the liquid crystal layer is possible via the dielectric layer on the side of the plasma cell.

Preferably, the step of preparing the dielectric layer includes the steps of: preparing a dielectric sheet having a property of selectively attenuating the ultraviolet rays; and chemically abrading the dielectric sheet. The dielectric sheet having a property of selectively attenuating the ultraviolet rays may be formed by first forming a comparatively thick dielectric sheet and then chemically abrading the dielectric sheet. This fabrication method alleviates the limitations on the material and the formation method for the dielectric sheet having a property of selectively attenuating the ultraviolet rays, and thus permits formation of a dielectric sheet with more excellent properties.

The liquid crystal display device of the second embodiment of the invention includes: a substrate; a dielectric layer; a liquid crystal layer sandwiched by the substrate and the dielectric layer; a plurality of stripe-shaped electrodes formed on a surface of the substrate facing the liquid crystal layer to extend in parallel with a first direction; and a plurality of stripe-shaped plasma channels formed to face the plurality of electrodes with the liquid crystal layer and the dielectric layer therebetween to extend in parallel with a second direction different from the first direction, a plurality of pixel regions being formed in respective crossings of the plurality of electrodes and the plurality of plasma channels, wherein the device further includes a pair of alignment layers formed on both surfaces of the liquid crystal layer, at least the alignment layer of the pair of alignment layers formed on the side of the dielectric layer selectively attenuates ultraviolet rays emitted from the plurality of plasma channels, and has an ultraviolet transmittance of less than 70% for a wavelength range of 340 nm or less.

The LCD device of the second embodiment of the invention includes a pair of alignment layers formed on both surfaces of the liquid crystal layer. At least the one of the pair of alignment layers formed on the side of the dielectric layer selectively attenuates ultraviolet rays emitted from the plurality of plasma channels. Accordingly, the alignment layer suppresses or prevents the organic materials such as liquid crystal molecules and the alignment layer itself constituting a liquid crystal cell from degrading due to ultraviolet rays of a specific wavelength generated by plasma discharge during use, and yet can transmit ultraviolet rays in other ranges. It is therefore possible to perform aligning processing and the like using ultraviolet rays allowed to pass through the dielectric layer. The wavelength of the ultraviolet rays selectively attenuated by the alignment layer is set depending on the plasma channels. The wavelength of the ultraviolet rays allowed to pass through the alignment layer may be appropriately set depending on the ultraviolet rays used in the fabrication process of the plasma addressed LCD device.

By adopting the alignment layer having a property of selectively attenuating the ultraviolet rays emitted from the plasma channels, no separate ultraviolet-blocking layer is required for selective ultraviolet attenuation. This simplifies the fabrication process, that is, reduces the number of fabrication steps. This also prevents possible occurrence of peeling off at the interface between such a separate ultraviolet-blocking layer and the alignment layer, and thus a reliable plasma addressed LCD device is obtained.

The ultraviolet transmittance of the alignment layer is preferably 40% or less for a wavelength of 320 nm and 80% or more for a wavelength of 365 nm.

Preferably, the liquid crystal layer includes liquid crystal molecules and a cured ultravioletcurable resin, and the initial orientation of the liquid crystal molecules is stabilized by the cured ultravioletcurable resin. By this stabilization, disorder of the orientation of the liquid crystal molecules is avoided, and thus variation in viewing angle characteristics during display is suppressed.

Preferably, the LCD device further includes a wall structure on the surface of the substrate facing the liquid crystal layer, the liquid crystal layer is divided into a plurality of liquid crystal regions by the wall structure, and the liquid crystal molecules in the liquid crystal regions are axially symmetrically oriented. The resultant ASM mode LCD device has wide viewing angle characteristics. Also, ultraviolet radiation is possible via the plasma cell in the fabrication process.

The alignment layer preferably includes a polymer material and inorganic particulates that attenuate the ultraviolet rays. By using the alignment layer including inorganic particulates, selection of the wavelength of ultraviolet rays to be attenuated is easy.

The alignment layer preferably includes a polymer material and an ultraviolet absorbent. Preferably, it further includes a photostabilizer. The alignment layer including an ultraviolet absorbent can absorb ultraviolet rays incident on the alignment layer. The alignment layer that further includes a photostabilizer can effectively capture radicals produced from the ultraviolet absorbent. Accordingly, by use is of an ultraviolet absorbent, and by use of a photostabilizer additionally, degradation of the liquid crystal cell is prevented.

The volume resistivity of the alignment layer is preferably $5 \times 10^{12} \Omega \cdot cm$ or more. By setting the volume resistivity of the alignment layer at $5 \times 10^{12} \Omega \cdot cm$ or more, the voltage retention can be kept high. Specifically, in order to keep the voltage retention high, the current flowing to the liquid crystal layer needs to be as small as possible. The specific resistance of a liquid crystal material is normally $1 \times 10^{12} \Omega \cdot cm$ or more, and the current flowing to the alignment layer that is in contact with the liquid crystal layer needs to be as small as possible. In consideration of these, the volume resistivity of the alignment layer is preferably greater than $1 \times 10^{12} \Omega \cdot cm$, more preferably $5 \times 10^{12} \Omega \cdot cm$ or more.

The method for fabricating the liquid crystal display device of the second embodiment of the invention is a method for fabricating a liquid crystal display device including: a substrate; a dielectric layer; a liquid crystal layer sandwiched by the substrate and the dielectric layer; a plurality of stripe-shaped electrodes formed on a surface of the substrate facing the liquid crystal layer to extend in parallel with a first direction; and a plurality of stripe-shaped plasma channels formed to face the plurality of electrodes with the liquid crystal layer and the dielectric layer therebetween to extend in parallel with a second direction different from the first direction, a plurality of pixel regions being formed in respective crossings of the plurality of electrodes and the plurality of plasma channels. The method includes the steps of: forming an alignment layer on the dielectric layer, the alignment layer selectively attenuating ultraviolet rays emitted from the plurality of plasma channels and having an ultraviolet transmittance of less than 70% for a wavelength range of 340 nm or less; and performing aligning processing for the alignment layer.

The above fabrication method includes the steps of forming an alignment layer on the dielectric layer for selectively attenuating ultraviolet rays emitted from the plurality of plasma channels and performing aligning processing for the alignment layer. By these steps, prevented are deterioration in the display quality of the liquid crystal cell due to ultraviolet radiation and disorder of the orientation of the liquid crystal molecules. As a result, it is possible to fabricate an LCD device that prevents deterioration in the display quality of the liquid crystal cell due to ultraviolet radiation during use.

As the method for fabricating another liquid crystal display device of the second embodiment of the invention in which liquid crystal molecules are axially symmetrically oriented, provided is a method for fabricating a liquid crystal display device including: a substrate; a dielectric layer; a liquid crystal layer sandwiched by the substrate and the dielectric layer; a plurality of stripe-shaped electrodes formed on a surface of the substrate facing the liquid crystal layer to extend in parallel with a first direction; and a plurality of stripe-shaped plasma channels formed to face the plurality of electrodes with the liquid crystal layer and the dielectric layer therebetween to extend in parallel with a second direction different from the first direction, a plurality of pixel regions being formed in respective crossings of the plurality of electrodes and the plurality of plasma channels, the device further comprising a wall structure on the surface of the substrate facing the liquid crystal layer, the liquid crystal layer being divided into a plurality of liquid crystal regions by the wall structure, the liquid crystal molecules in the liquid crystal regions being axially symmetrically oriented, the method comprising the steps of: forming the wall structure on the substrate; forming an alignment layer on the dielectric layer, the alignment layer selectively attenuating ultraviolet rays emitted from the plurality of plasma channels and having an ultraviolet transmittance of less than 70% for a wavelength range of 340 nm or less; injecting a material including liquid crystal molecules and an ultravioletcurable resin in a space between the dielectric layer on which the alignment layer is formed and the substrate on which the wall structure is formed; and stabilizing initial orientation of the liquid crystal molecules by irradiating the material with ultraviolet rays having a wavelength of 365 nm via the dielectric layer to cure the ultravioletcurable resin.

According to the above method of the invention, initial orientation of the liquid crystal molecules is stabilized. As a result, it is possible to fabricate an ASM mode LCD device that prevents deterioration in the display quality of the liquid crystal cell due to ultraviolet radiation during use. Accordingly, for fabrication of an LCD device that necessitates ultraviolet radiation to the liquid crystal layer, such as an ASM mode color plasma addressed LCD device, the method according to the invention is advantageous because ultraviolet radiation to the liquid crystal layer is possible via the dielectric layer on the side of the plasma cell.

BRIEF DESCRIPTION OF THE DRAWINGS

FIGS. 5A, 5B, and 5C are schematic illustrations for description of axially symmetrical orientation of liquid crystal molecules in a liquid crystal layer.

DESCRIPTION OF THE PREFERRED EMBODIMENTS

Hereinafter, preferred embodiments of the present invention will be described with reference to the accompanying drawings. ASM mode plasma addressed LCD devices are exemplified in the following description. It should be noted, however, that the present invention is also applicable to plasma addressed LCD devices of any modes other than the ASM mode.

Figure 1A:
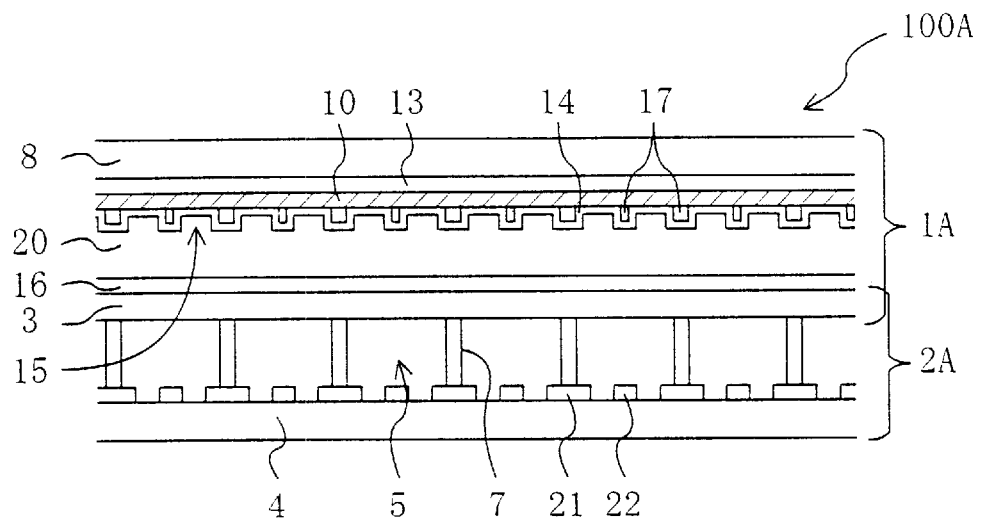
FIGS. 1A and 1B are schematic cross-sectional views of plasma addressed LCD devices of the first embodiment of the present invention.
Figure 1B:
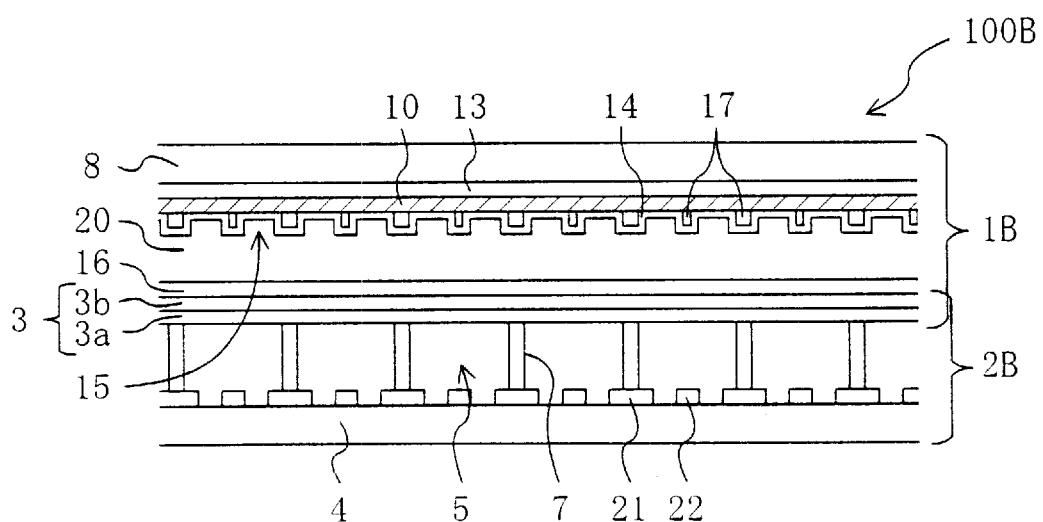
Figure 2:
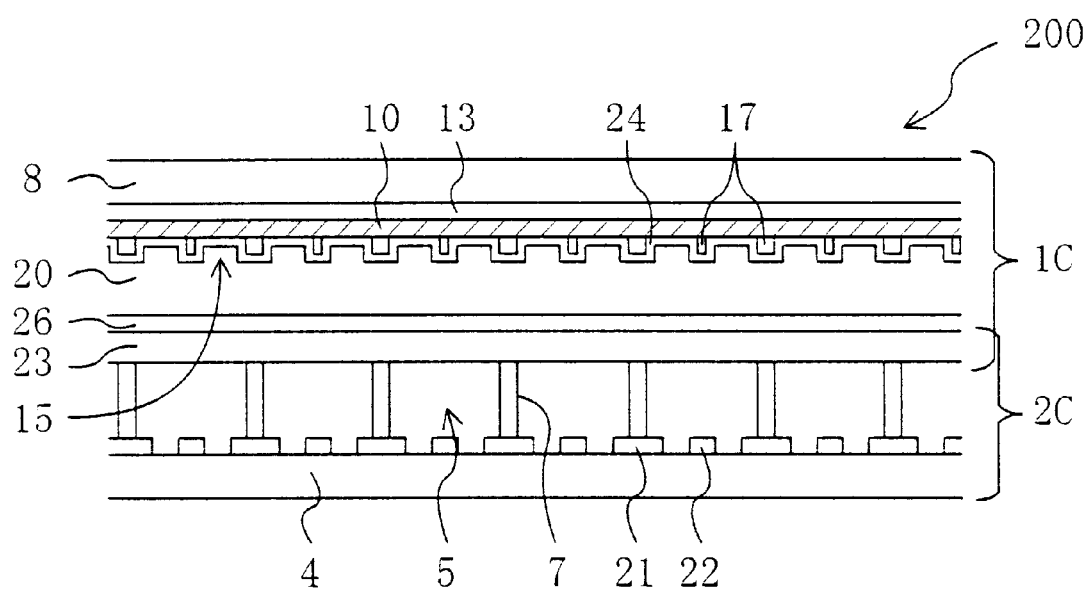
FIG. 2 is a schematic cross-sectional view of a plasma addressed LCD device of the second embodiment of the invention.
Figure 3:
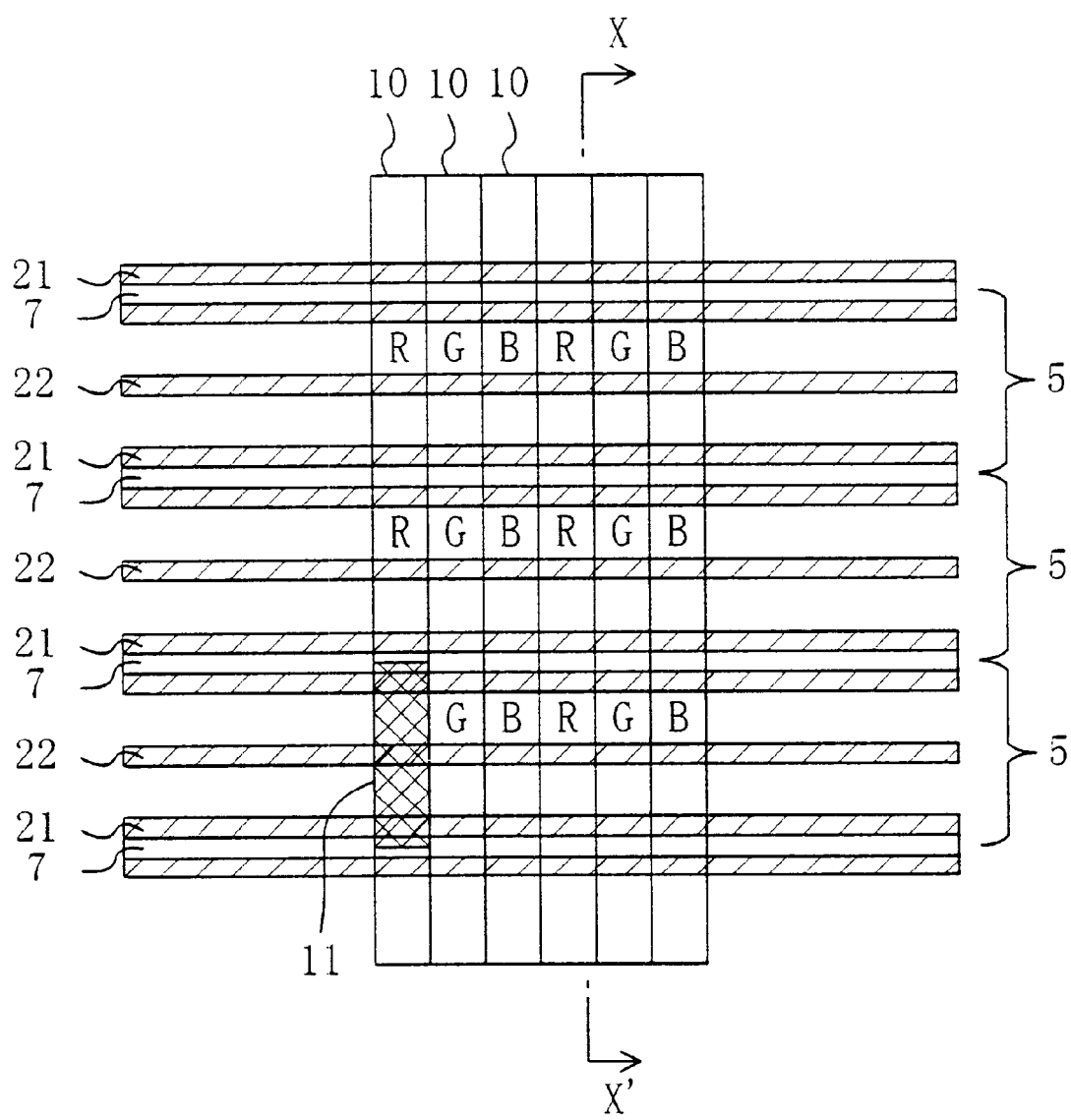
FIG. 3 is a schematic top view of the LCD devices of the embodiments of the invention.

FIGS. 1A and 1B schematically illustrate the cross-sectional structures of plasma addressed LCD devices 100A and 100B, respectively, of the first embodiment of the LCD device of the present invention. FIG. 2 schematically illustrates the cross-sectional structure of a plasma addressed LCD device 200 of the second embodiment of the LCD device of the present invention. FIG. 3 is a top view (viewed at an angle normal to a substrate) of the LCD devices 100A, 100B, and 200, schematically illustrating the arrangement of plasma channels 5 and signal electrodes 10. FIGS. 1A, 1B, and 2 correspond to the cross-sectional views taken along line X–X' in FIG. 3. In FIGS. 1A, 1B, and 2, common or equivalent components of the LCD devices 100A, 100B, and 200 are denoted by the same reference numerals.

As shown in FIGS. 1A, 1B, or 2, the LCD device 100A, 100B, 200 includes a liquid crystal cell 1A, 1B, 1C and a plasma cell 2A, 2B, 2C. A dielectric layer 3, 23 is a component commonly used for the liquid crystal cell 1A, 1B, 1C and the plasma cell 2A, 2B, 2C.

The liquid crystal cell 1A, 1B, 1C includes a substrate 8, the dielectric layer 3, 23, and a liquid crystal layer 20 sandwiched by the substrate 8 and the dielectric layer 3, 23. A plurality of stripe-shaped signal electrodes 10 and colored layers 13 are formed on the surface of the substrate 8 facing the liquid crystal layer 20. The colored layers 13 are composed of red (R), green (G), and blue (B) layers formed in sequence to correspond to the plurality of stripe-shaped signal electrodes 10. The colored layers 13 may be omitted to provide a monochrome display device. A wall structure 17 is formed on the surface of the substrate 8 on which the colored layers 13 are formed for dividing the liquid crystal layer 20 into a plurality of liquid crystal regions 15.

The liquid crystal regions 15 are defined by the wall structure 17 that substantially surrounds the respective liquid crystal regions 15 two-dimensionally. Alignment layers 14 and 16, 24 and 26 are formed on the surfaces of the substrate 8 and the dielectric layer 3, 23 facing the liquid crystal layer 20 for aligning liquid crystal molecules (not shown) in the liquid crystal layer 20. The liquid crystal molecules in the respective liquid crystal regions 15 are oriented axially symmetrically, in two or more different directions, or randomly, under the orientation regulating force of the alignment layer 14, 24 formed by a non-rubbing process and the wall effect of the wall structure 17.

In the LCD device 100A, 100B, the liquid crystal cell 1A, 1B may have a construction of a known liquid crystal cell and can be manufactured by a known method, except for the dielectric layer 3. In the LCD device 200, the liquid crystal cell 1C may have a construction of a known liquid crystal cell and can be manufactured by a known method, except for the alignment layer 26. For example, the wall structure 17 may be formed by a known method (for example, photolithography, dry etching, and printing) using an acrylic patterning material. The features and formation methods for the dielectric layer 3 and the alignment layer 26 will be described later in detail.

In the liquid crystal cell 1A, 1B, 1C, aligning processing may be performed, without existence of the wall structure, by the method disclosed in Japanese Laid-Open Patent Publication No. 10-87859 or No. 10-148835, for example, to obtain a plasma addressed LCD device having wide viewing angle characteristics other than the ASM mode LCD device.

The plasma cell 2A, 2B, 2C includes a plurality of stripe-shaped plasma channels 5 each formed as a space surrounded by a glass substrate 4, the dielectric layer 3, 23, and partitions 7 extending between the glass substrate 4 and the dielectric layer 3, 23. The plasma channels 5 face the signal electrodes 10 with the liquid crystal layer 20 and the dielectric layer 3, 23 therebetween, and extend in the direction orthogonal to the length of the signal electrodes 10. In other words, when the direction in parallel with the length of the signal electrodes 10 is called the first direction, the plasma channels 5 extend in parallel with the second direction different from the first direction. Pixel regions 11 are formed at the respective crossings of the plurality of signal electrodes 10 and the plurality of plasma channels 5 (see FIG. 3).

Ionizable discharge gas (for example, Xe—Hg gas) is sealed in each of the plasma channels 5. By applying a voltage (discharge voltage) between an anode 21 and a cathode 22 that are formed on the glass substrate 4, the discharge gas is ionized generating plasma (plasma discharge). During the plasma discharge, ultraviolet rays are emitted. The wavelength and intensity of the ultraviolet rays depend on the kind and/or the pressure of the discharge gas. In general, ultraviolet components in the short wavelength range of 340 nm or less, in particular, in the range of 310 nm or less have a greater influence in denaturation, degeneration, and the like of an organic substance due to ultraviolet absorption. Ultraviolet rays having a wavelength longer than 340 nm, which are also emitted in some cases, have a smaller influence in the denaturation, degeneration, and the like of an organic substance.

The components of the plasma cell 2A, 2B other than the dielectric layer 3 and the entire plasma cell 2C may have a construction of a known plasma cell and can be manufactured by a known method.

Figure 4:
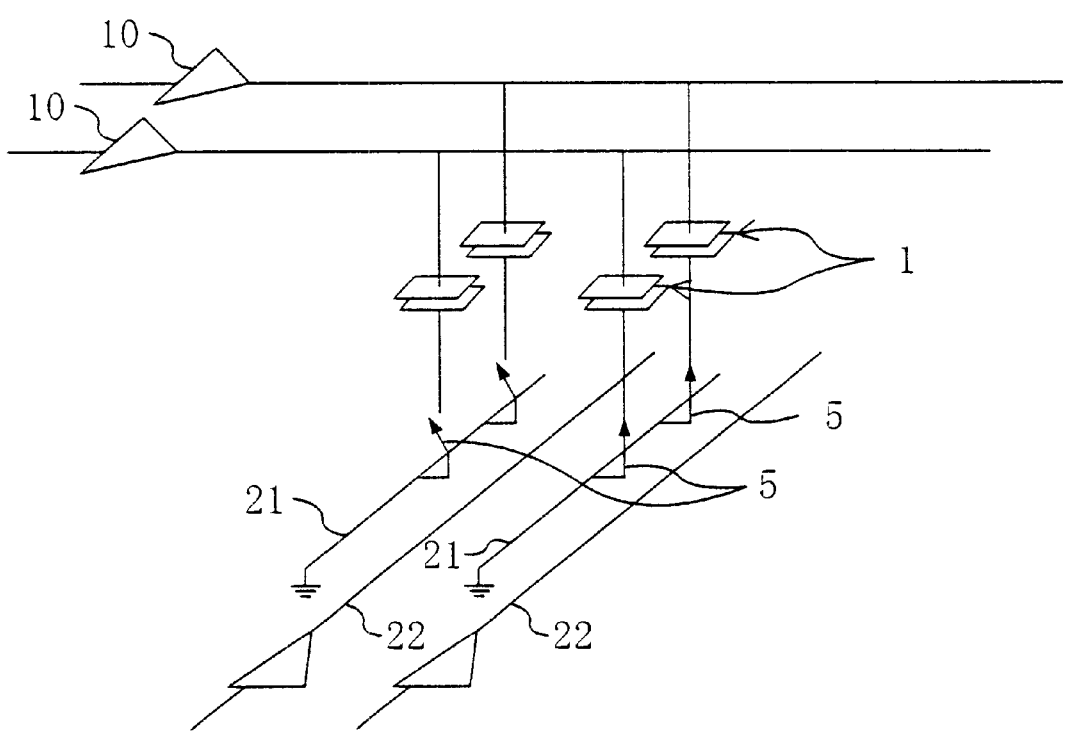
FIG. 4 is a schematic illustration of the construction of four pixels in the LCD devices of the embodiments of the invention.

The operation of the LCD device 100A, 100B, 200 will be briefly described with reference to the electrical configuration shown in FIG. 4. A scanning voltage is sequentially applied to the cathodes 22 arranged in row to generate discharge plasma in the respective plasma channels 5. Upon generation of discharge plasma, the respective plasma channels 5 are substantially uniformly dominated by the potential at the anodes 21 (for example, ground potential). The plasma channels 5 thus serve as switches as indicated by the arrows in FIG. 4. In synchronization with the activation of the plasma channels 5, a video signal voltage is applied to the signal electrodes 10 arranged in column. Upon application of the video signal voltage, a voltage corresponding to the video signal voltage is applied to the pixel regions of the liquid crystal cell 1A, 1B, 1C. Liquid crystal molecules in the liquid crystal layer 20 change orientation thereof depending on the applied voltage. Incident light from a back-light (not shown) disposed outside the plasma cell 2A, 2B, 2C is modulated with the change in the orientation of the liquid crystal molecules. Thus, an image is displayed. A pair of polarizing plates (not shown) are disposed to sandwich the liquid crystal cell 1A, 1B, 1C and the plasma cell 2A, 2B, 2C.

Referring to FIGS. 5A, 5B, and 5C, the construction of the liquid crystal layer 20 of the plasma addressed LCD device 100A, 100B, 200 will be described. The liquid crystal layer 20 is divided into a plurality of liquid crystal regions 15 by the lattice-shaped wall structure 17 as shown in FIG. 5A. The liquid crystal regions 15 are not necessarily separated completely from one another by the wall structure 17. Therefore, the height of the wall structure 17 may be smaller than the thickness of the liquid crystal layer 20. Using such a low wall structure 17, division of the liquid crystal layer 20 into the plurality of liquid crystal regions 15 is possible. The liquid crystal regions 15 are typically rectangular corresponding to the respective pixels. Alternatively, a plurality of liquid crystal regions 15 may correspond to one pixel.

For example, in an N mode display, liquid crystal molecules are inclined to orient vertically under the orientation regulating force of the alignment layer (not shown in FIG. 5A) formed covering the surface of the wall structure 17. As a result, the liquid crystal molecules in the liquid crystal regions 15 are oriented axially symmetrically. The axial symmetrical orientation includes radial, tangential, and spiral orientations, and any combination thereof. FIG. 5B schematically illustrates the spirally oriented liquid crystal region 15. FIG. 5C schematically illustrates orientations of liquid crystal directors 15a, 15b, and 15c in top, middle, and bottom layers 15T, 15M, and 15B of the liquid crystal region 15. The liquid crystal material used for the illustrated liquid crystal layer includes a predetermined chiral agent, and thus the liquid crystal molecules are oriented to twist by 90° along the thickness of the layer (vertically to the substrate).

The liquid crystal molecule directors 15a in the top layer 15T are oriented spirally around a symmetric axis formed vertically to the glass substrate 4. The liquid crystal molecule directors 15b in the middle layer 15M are twisted by 45° with respect to the orientation of the liquid crystal molecule directors 15a in the top layer 15T, and are oriented substantially tangentially around the symmetric axis. The liquid crystal molecule directors 15c in the bottom layer 15B are further twisted by 45° with respect to the liquid crystal molecule directors 15b, and thus oriented spirally. The liquid crystal region 15 having the 90° twisted axially symmetrical orientation has the rotary power of twisting the polarization direction of linearly polarized light by the 90°. When polarizing plates (not shown) arranged in a crossed-Nicols state are provided in the LCD device 100A, 100B, 200, for example, bright display is realized in the orientation state shown in FIGS. 5B and 5C.

In the ASM mode LCD device 100A, 100B, and 200 including the axially symmetrically oriented liquid crystal regions 15, the refractive index anisotropy of the liquid crystal molecules is averaged over all the azimuthal directions. This means that retardation of the liquid crystal molecules is mutually compensated. This solves the conventional problem that the viewing angle characteristics greatly differ depending on the azimuthal direction, which is observed in the gray scale display state in a conventional TN mode LCD device. Thus, an LCD device having wide viewing angle characteristics is obtained.

The axially symmetrical orientation may be established during voltage application by using a liquid crystal material having negative dielectric anisotropy (for example, MLC-6609) (N mode), or may be established during non-voltage application by using a liquid crystal material having positive dielectric anisotropy (for example, ZLI-4792) (P mode). In either case, a known material may be used as the liquid crystal material. Preferably, a fluorine-based composition that is stable and has a high specific resistance is used.

The initial axially symmetrical orientation of the liquid crystal molecules described above can be stabilized by curing an ultravioletcurable resin mixed in the liquid crystal material (see Japanese Laid-Open Patent Publication No. 9-197384, for example). To state in more detail, the substrate 8 with the wall structure 17 and the alignment layer 14, 24 formed thereon and the dielectric layer 3 (including a dielectric sheet 3a), 23 are bonded together with a space therebetween to obtain the liquid crystal cell (vacant cell). A mixture of a liquid crystal material and an ultravioletcurable resin (for example, an acrylic photopolymerizable resin, a photopolymerizable resin disclosed in Japanese Laid-Open Patent Publication No. 6-301015, and the like) is injected into the space of the liquid crystal cell. The mixture is then irradiated with ultraviolet rays via the dielectric layer 3, 23 from the side of the plasma cell 2A, 2B, 2C.

In general, an ultravioletcurable resin is prepared to be sensitive to, and cured upon irradiation of, ultraviolet rays of around i-line (365 nm) that is one of emission lines of general ultraviolet light sources such as an ultra high-pressure mercury-vapor lamp. Therefore, the ultravioletcurable resin irradiated with i-line is polymerized (cured), forming a three-dimensional structure (loose network-like structure). With this three-dimensional structure made of the cured ultravioletcurable resin, the axially symmetrical orientation of the liquid crystal molecules is stabilized. In order to realize this stabilization of the axially symmetrical orientation with ultraviolet radiation, the dielectric layer 3, 23 must transmit at least the i-line sufficiently. It is difficult to transmit i-line sufficiently from the side of the substrate 8 because the colored layers 13 are formed on the substrate 8.

The dielectric layer 3 of the plasma addressed LCD device 100A, 100B of the first embodiment of the invention selectively attenuates ultraviolet rays emitted from the plasma channels 5. Preferably, the dielectric layer 3 has a transmittance of 70% or less for ultraviolet rays in the wavelength range of 340 nm or less with respect to the ultraviolet transmittance of the air of 100%, and a transmittance of 80% or more for ultraviolet rays having a wavelength of 365 nm. If the transmittance for ultraviolet rays in the wavelength range of 340 nm or less exceeds 70%, the effect of attenuating ultraviolet rays emitted during plasma discharge is insufficient. This may fail to sufficiently suppress degradation of the liquid crystal material or the alignment layers. If the transmittance for 365 nm ultraviolet ray (i-line) is less than 80%, it is difficult to sufficiently cure the ultravioletcurable resin for stabilization of the axially symmetrical orientation, or it takes long time to complete the curing.

If the transmittance of the dielectric layer 3 for visible light rays (wavelength range of 400 to 800 nm) is reduced, display brightness decreases. Accordingly, the transmittance for visible light is preferably 95% or more.

The transmittance of the dielectric layer 3 is preferably 50% or less, more preferably 40% or less, for ultraviolet rays having a wavelength of 320 nm, and 15% or less, more preferably 10% or less, further preferably 5% or less, for ultraviolet rays in the wavelength range of 310 nm or less. If the transmittance for ultraviolet rays in the wavelength range of 310 nm or less exceeds 15%, the effect of attenuating ultraviolet rays emitted during plasma discharge may be insufficient in some cases. This is probably due to the facts that the ultraviolet rays emitted during plasma discharge includes a large amount of short wavelength components of 320 nm or less and that, as the wavelength of ultraviolet rays is shorter, greater energy is generated resulting in degrading organic substances more easily.

The alignment layer 26 of the plasma addressed LCD device 200 of the second embodiment of the invention selectively attenuates ultraviolet rays emitted from the plasma channels 5. The alignment layer 26 has a transmittance of less than 70%, preferably 65% or less, for ultraviolet rays in the wavelength range of 340 nm or less with respect to the ultraviolet transmittance of the air of 100%. If the transmittance for ultraviolet rays in the wavelength range of 340 nm or less is 70% or more, the effect of attenuating ultraviolet rays emitted during plasma discharge is insufficient. This may fail to sufficiently suppress degradation of the liquid crystal material or the alignment layers. Further, the transmittance of the alignment layer 26 is preferably 40% or less, preferably 35% or less, for ultraviolet rays having a wavelength of 320 nm and 80% or more for ultraviolet rays having a wavelength of 365 nm. In particular, the transmittance of the alignment layer 26 is 15% or less, more preferably 10% or less, further preferably 5% or less, for ultraviolet rays in the wavelength range of 310 nm or less. If the transmittance for ultraviolet rays in the wavelength range of 310 nm or less is more than 15%, the effect of attenuating ultraviolet rays emitted during plasma discharge may be insufficient in some cases due to the reasons described above in relation to the dielectric layer 3. If the transmittance for 365 nm ultraviolet ray (i-line) is less than 80%, it is difficult to sufficiently cure the ultraviolet curable resin for stabilization of the axially symmetrical orientation, or it takes long time to complete the curing.

If the transmittance of the alignment layer 26 for visible light rays (wavelength range of 400 to 800 nm) is reduced, display brightness decreases. Accordingly, the transmittance for visible light is preferably 95% or more.

The ultravioletcurable resin may be sensitive to ultraviolet rays of which wavelength is a little deviated from the i-line. Strictly, therefore, the wavelength of ultraviolet rays actually most contributable to curing of the ultraviolet curable resin depends on the relationship between the ultraviolet emission intensity of a source and the sensitivity of the ultraviolet-curable resin. General ultraviolet sources emit very strong i-line. Therefore, the i-line may be considered substantially contributable to curing of the ultravioletcurable resin even when the sensitive peak wavelength of the ultravioletcurable resin is a little deviated. Actually, the ultravioletcurable resin is irradiated with ultraviolet rays in a range other than the i-line (g-line or h-line having a wavelength longer than the i-line).

Ultraviolet radiation may also be performed, not only in the fabrication process of the ASM mode plasma addressed LCD device described above, in a process after cell assembly, such as a process of changing the pretilt angle by irradiating an alignment layer with ultraviolet rays (see Japanese Laid-Open Patent Publication No. 10-148835, for example). In either case, in order to perform aligning processing under ultraviolet radiation, the alignment layer 26 must sufficiently transmit ultraviolet rays in at least a specific wavelength range.

As described before, the wall structure 17 is covered with the alignment layer 14, 24, and thus the liquid crystal material is kept apart from the wall structure 17. Accordingly, if the wall structure 17 is degraded due to ultraviolet radiation, the influence of this degradation on the display quality will be small. As for other structures covered with an alignment layer, such as conventional spacer structures, also, the influence of degradation of such structures due to ultraviolet radiation on the display quality will be small.

The influence of ultraviolet rays on organic materials such as the liquid crystal molecules and the alignment layers constituting the liquid crystal cell was examined. The results are as described below.

Figure 6:
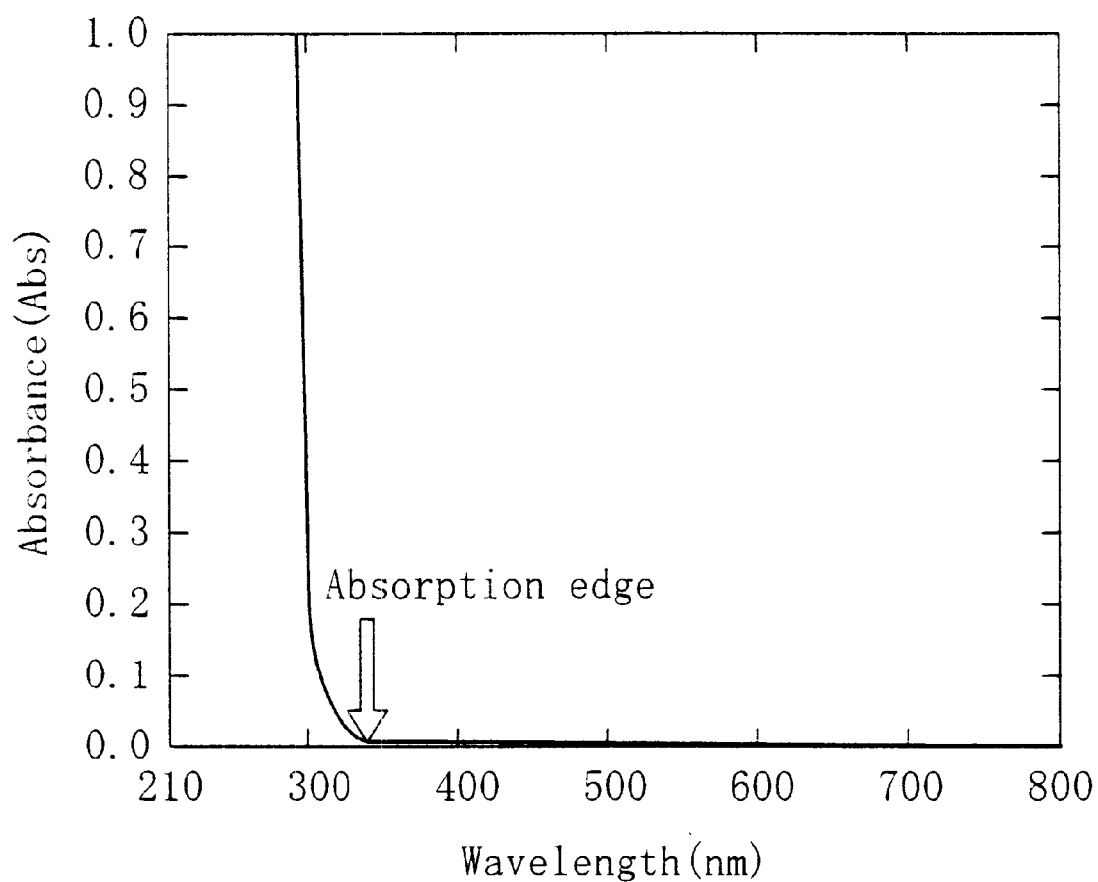
FIG. 6 is a graph showing the absorption spectrum of a liquid crystal sample having properties of $\Delta n=0.08$, $\Delta \in =-3.5$.

FIG. 6 shows the absorption spectrum of a liquid crystal sample having properties of $\Delta n=0.08$, $\Delta\in=-3.5$, as a typical liquid crystal material. As is found from FIG. 6, the absorption edge of this liquid crystal material is at about 350 nm. In general, the absorption edge of organic materials used for a liquid crystal cell (liquid crystal molecules, alignment layers, and the like) is at 350 nm or less. This indicates that these organic materials easily absorb ultraviolet rays in the wavelength range of 350 nm or less and degrade due to this absorption. As a result of quantitative evaluation of the influence of ultraviolet rays, confirmed was that it was effective to block ultraviolet rays in the wavelength range of 340 nm or less for suppressing degradation of organic materials constituting the liquid crystal cell due to ultraviolet radiation. This is described below in detail.

For quantitative evaluation of the influence of ultraviolet rays, test cells (liquid crystal cells) were irradiated with ultraviolet rays having different wavelengths to examine changes in voltage retention. The test cells were produced using the same liquid crystal materials as those used for the actual liquid crystal cell (MLC-6609 manufactured by Merck & Co., Inc., $\Delta n=0.077$, $\Delta\in=-3.7$). After a rectangular wave of +5 V having a frame frequency of 30 Hz and a selection pulse width of 60 µs was applied to the test cells, the voltage retentions of the test cells were measured at 70° C. The test cells were irradiated with ultraviolet rays of 10 J/cm² using a high-pressure mercury-vapor lamp (USH-250D manufactured by Ushio Inc.) and the following two types of optical filters (UV34 and UV30 both manufactured by Hoya Corp.).

| UV34- | Transmittance for 320 nm UV rays: | about 0% |
|---|---|---|
|  | Transmittance for 340 nm UV rays: | about 40% |
|  | Transmittance for 360 nm UV rays: | about 80% |
| UV30- | Transmittance for 280 nm UV rays: | about 0% |
|  | Transmittance for 300 nm UV rays: | about 40% |
|  | Transmittance for 320 nm UV rays: | about 80% |

As for the test cells irradiated with ultraviolet rays through UV34 filters, decrease in voltage retention due to ultraviolet radiation was little recognized. On the contrary, as for the test cells irradiated with ultraviolet rays through UV30 filters, the voltage retention decreased by 10% or more due to ultraviolet radiation, which was found greatly influential on the display quality. From these results, found is that, in order to suppress deterioration in display quality caused by degradation of organic materials of the liquid crystal cell due to ultraviolet radiation, it is greatly effective to suppress the liquid crystal cell from being irradiated with ultraviolet rays in the short and middle wavelength range of 340 nm or less.

Hereinafter, a specific construction and formation method of the dielectric layer 3 of the plasma addressed LCD device 100A, 100B of the first embodiment of the invention will be described.

The dielectric layer 3 of the LCD device 100A, 100B has a property of selectively attenuating ultraviolet rays emitted from the plasma channels 5. The dielectric layer 3 may be composed of a single dielectric sheet as in the LCD device 100A shown in FIG. 1A, or may be composed of an ultraviolet-transmitting dielectric sheet (typically, a glass sheet) 3a and an ultraviolet-blocking layer 3b having the property of selectively attenuating ultraviolet rays emitted from the plasma channels 5. The ultraviolet-blocking layer 3b may be formed on at least one surface of the dielectric sheet 3a.

The construction and formation method of the dielectric layer 3 composed of a single dielectric sheet of the LCD device 100A of FIG. 1A will be described.

In general, a glass sheet having a thickness of about 100 µm or less is used as the dielectric sheet of a plasma addressed LCD device. Into a glass sheet material, mixed is a material having the property of attenuating (absorbing or scattering) ultraviolet rays in the wavelength range of 340 nm or less. In this way, obtained is the dielectric sheet 3 as the dielectric layer that selectively attenuates ultraviolet rays emitted from the plasma cells 5 while transmitting ultraviolet rays including i-line. The i-line is an ultraviolet ray used during aligning processing in the fabrication process for the plasma addressed LCD device 100A.

The dielectric sheet 3 having a thickness of about 100 μm or less is obtained by drawing a flat plate produced by a roll-out method, a float method, a fusion method, or the like into a thin sheet by re-drawing (down-drawing). In the process of producing the flat plate, material glass powder is mixed with metal oxide particulates, for example, having a desired ultraviolet blocking property. In this way, produced is the dielectric sheet 3 having the desired ultraviolet blocking property. The metal oxide particulates can be obtained by grinding a bulk material, which is produced by a vapor-phase synthesis process or a sol-gel process using a metal alkoxide precursor and the like, and classifying the ground pieces. The sol-gel process includes hydrolyzing a precursor of a metal organic or inorganic compound and heating the hydrolyzed product to be subjected to condensation and thus gelation. In the case of directly producing the dielectric sheet 3 by the sol-gel process, a material having a desired ultraviolet blocking property may be added as the precursor material.

The dielectric sheet 3 produced by the sol-gel process may occasionally have fine concave and convex portions or holes on the surface. Therefore, the surface layer of the dielectric sheet 3 is preferably chemically abraded to flatten the surface. For example, the dielectric sheet 3 may be immersed in a chemical abrasive solution of hydrofluoric acid or buffered hydrofluoric acid containing a pH controller, a viscosity controller, and the like, for etching abrasion. In this etching, the thickness of the dielectric sheet 3 may be adjusted. The dielectric sheet 3 may be of a uniform phase, or a non-uniform phase with inorganic particulates having a desired ultraviolet blocking property dispersed in a glass matrix. The particulate-dispersed phase has a great effect of attenuating ultraviolet rays by scattering. However, the size of the particulates must be appropriately regulated so as to avoid excessive scattering of visible light or ultraviolet rays in the required wavelength range.

Next, the construction and formation method of the dielectric layer 3 of the plasma addressed LCD device 100B of FIG. 1B will be described. The dielectric layer 3 of this device is composed of the dielectric sheet 3a and the ultraviolet-blocking layer 3b.

In this case, the ultraviolet-blocking layer 3b having the property of selectively attenuating ultraviolet rays emitted from the plasma cell is independently formed on the dielectric sheet 3a. Therefore, as the dielectric sheet 3a, a conventional glass sheet, that is, a glass sheet that transmits ultraviolet rays, may be used. Alternatively, however, the dielectric sheet 3 having the ultraviolet-blocking property described above may be used. The dielectric layer 3 may be of a layered structure including a plurality of ultraviolet-blocking layers 3b. The ultraviolet-blocking layer 3b may be formed on the surface of the dielectric sheet 3a facing the liquid crystal layer, on the surface thereof facing the plasma channels 5, or on both surfaces thereof.

The ultraviolet-blocking layer 3b may be formed using an inorganic material, an inorganic-organic hybrid material, or an organic material. An inorganic material or an inorganic-organic hybrid material is typically prepared as a mixed solution or a dispersion solution by solving or dispersing an inorganic matrix material for providing a film formation capability and a filler having the ultraviolet blocking property in a solvent. The resultant mixed solution or dispersion solution is applied to the dielectric sheet 3a by a known method, and dried or cured as required, to obtain the ultraviolet-blocking layer 3b.

Examples of the inorganic matrix material include: alkoxysilane (for example, tetramethoxysilane, tetraethoxysilane, monomethyltrimethoxysilane, and monoethyltrimethoxysilane) and hydrolysates and partial condensates thereof; and polyorganosilane precursors such as polymerizable silane compounds. Polyorganosilane precursors have comparatively broad applicability for the purpose of the present invention.

An inorganic-organic hybrid material where an organic precursor is added to the above-described inorganic matrix material may also be used. Examples of the organic precursor (e.g., organic monomer) used for the inorganic-organic hybrid material include polymerizable unsaturated groups that can be copolymerized with the inorganic matrix material, such as vinyl, (meta)allyl, (meta)acryloiloxy, 2-(meta)acryloiloxyethyl, 2-(meta)acryloiloxypropyl, 3-(meta)acryloiloxypropyl, 2-(meta)acryloiloxybutyl, 3-(meta)acryloiloxybutyl, 4-(meta)acryloiloxybutyl, 2-styrilethyl, 3-styrilpropyl, and 4-styrilbutyl groups.

As the organic material for forming the ultraviolet-blocking layer 3b, used are organic matrix materials including polyimide-type resins such as polyimide resin, polyester imide resin, polyether imide resin, and polyamide imide resin, polyamide resins, polystyrene resins, polyurethane resins, epoxyacrylate resins, and resins including any of these resins as a major ingredient. The polyimide-type resins also include polyamide acid resin as a precursor of a polyimide, partially imidized polyamide acid resin, polyisoimide resin, and a copolymer thereof. The polyimide resin is produced by reacting a tetracarboxylic acid dianhydride (including a derivative thereof) and a diamine compound (including a derivative thereof).

For regulating the properties (viscosity, curing rate, and the like) of the matrix material, a filler that functions as a dispersion gelation agent may be added to the matrix. Specific examples of the filler include metals, alloys, metal oxides, metal hydroxides, metal carbides, metal nitride, and complexes thereof, as well as organic pigments, inorganic pigments, and water-insoluble pigments. These fillers are added to the matrix in the form of particulates, whiskers, fibers, flakes, and the like. In addition, colloidal silica, colloidal alumina, and/or a curing agent, for example, may be added to the matrix, if desired.

As the inorganic filler for selectively blocking ultraviolet rays emitted from the plasma cells 2B (in particular, ultraviolet rays in the short wavelength range of 340 nm or less), used are inorganic particulates of titanium oxide, cerium oxide, zirconium oxide, ferric oxide, cobalt oxide, zinc oxide, aluminum oxide, silicon dioxide, ferric hydroxide, aluminum hydroxide, and the like, for example. These fillers for ultraviolet blocking may be used singularly, as mixtures, or as complexes. The complexes include solid solutions and cluster compounds (multi-particulate compounds in the state where part of particles are locally correlated with each other). The complexes also include particles obtained by coating the inorganic particulates or the solid solution particles described above with a different kind of inorganic material. For example, titanium oxide particles or solid solution particles thereof may be coated with silica, a silica-alumina mixture, or a silica-zirconia mixture. These fillers for ultraviolet blocking may not be in the form of particulates, but may be in the form of whiskers, fibers, flakes, and the like. The fillers for ultraviolet blocking may also serve as the dispersion gelation agent described above.

The average particle size of the filler for ultraviolet blocking used in the invention is about 2 nm to about 100 nm, preferably about 10 nm to about 50 nm, when the filler is inorganic particulates, for example. The concentration of the filler for ultraviolet blocking with respect to the weight of the matrix is preferably about 3 wt. % or more in order to ensure sufficient ultraviolet blocking. Also, it is preferably about 45 wt. % or less in order to prevent aggregation or increase in viscosity of the filler for ultraviolet blocking. The concentration is more preferably in the range of about 5 wt. % to about 35 wt. %.

The filler for ultraviolet blocking described above is selected from inorganic materials such as titanium oxide mentioned above based on the wavelength of ultraviolet rays to be attenuated and the wavelength of ultraviolet rays to be transmitted. Since a compound constituting the filler for ultraviolet blocking has different band gaps, it is possible to provide a desired ultraviolet blocking property and a desired ultraviolet transmitting property. The filler for ultraviolet blocking can attenuate ultraviolet rays not only by absorbing ultraviolet rays having a specific wavelength but also by scattering ultraviolet rays. In general, shorter wavelength ultraviolet rays are more easily scattered. The degree of scattering also depends on the particle size and the density of the filler for ultraviolet blocking. Therefore, the filler for ultraviolet blocking may be appropriately optimized according to the ultraviolet blocking property (ultraviolet transmitting property and visible light transmitting property) required.

When an organic material is used for formation of the ultraviolet-blocking layer 3b, both an ultraviolet absorbent and a photostabilizer are preferably added to the resin (matrix) material. The resin material, the ultraviolet absorbent, and the photostabilizer are solved or dispersed in a solvent to prepare a mixed solution or a dispersion solution. The resultant mixed solution or dispersion solution is applied to the dielectric sheet 3a by a known method, and dried or cured as required, to form the ultraviolet-blocking layer 3b.

The ultraviolet absorbent absorbs ultraviolet rays that degrade the organic materials constituting the liquid crystal cell such as the liquid crystal molecules and the alignment layers, and converts the absorbed ultraviolet rays into thermal energy, thereby repeating tautomerism. The ultraviolet absorbent therefore has a semipermanent ultraviolet absorption function. Examples of the ultraviolet absorbent include organic ultraviolet absorbents of benzophenone, benzotriazole, anilide oxalate, cyanoacrylate, triazine, and the like. Specific examples are 2,4-dihydroxybenzophenone, 2,2'-dihyroxy-4,4'-dimethoxybenzophenone, 2-(2'-hydroxy-5'-methylphenyl)benzotriazole, ethyl-2-cyano-3,3'-diphenylacrylate. These ultraviolet absorbents convert ultraviolet energy into thermal energy in the course of tautomerism between hydrogen atoms of hydroxyl groups in molecules and oxygen atoms, nitrogen atoms, or the like in the molecules or in the course of reversible isomerization due to electron transfer caused by inner-molecular hydrogen bonding between hydrogen atoms of hydroxyl groups in molecules and carbonyl groups, nitrogen atoms, or the like in the molecules.

The photostabilizer, which is preferably used together with the ultraviolet absorber described above, prevents degradation of the organic materials by capturing various radicals generated by the ultraviolet absorption. Typically, an organic photostabilizer having a piperidine ring that has inner-molecular steric hindrance is preferred.

The ultraviolet-blocking layer 3b may further include other additives such as a quenching agent and a peroxide decomposing agent.

A protection layer may further be formed on the ultraviolet-blocking layer 3b. As the protection layer, a layer having high surface electric resistance or a layer having high surface smoothness may be formed. Examples of such a protection layer include polysiloxane inorganic films, organic-inorganic hybrid films, and acrylic and epoxy organic films. The protection layer may be of a multilayer structure. The protection layer may be directly formed on the dielectric sheet 3 having the ultraviolet-blocking property.

The ultraviolet-blocking layer 3b and the protection layer are formed by a known method such as spin coating, spraying, printing, evaporation, or dipping, for example. An appropriate method may be selected from these methods depending on the material. Dipping is advantageous in that the ultraviolet-blocking layers 3b and the like can be formed on both surfaces of the dielectric sheet 3a at one time.

By forming the ultraviolet-blocking layer 3b on the dielectric sheet 3a, the voltage $V_{LC}$ applied across the liquid crystal layer 20 decreases. The amount of voltage decrease is preferably regulated so that the voltage decrease is not recognized as deterioration in display quality. This is specifically performed in the following manner.

Figure 7:
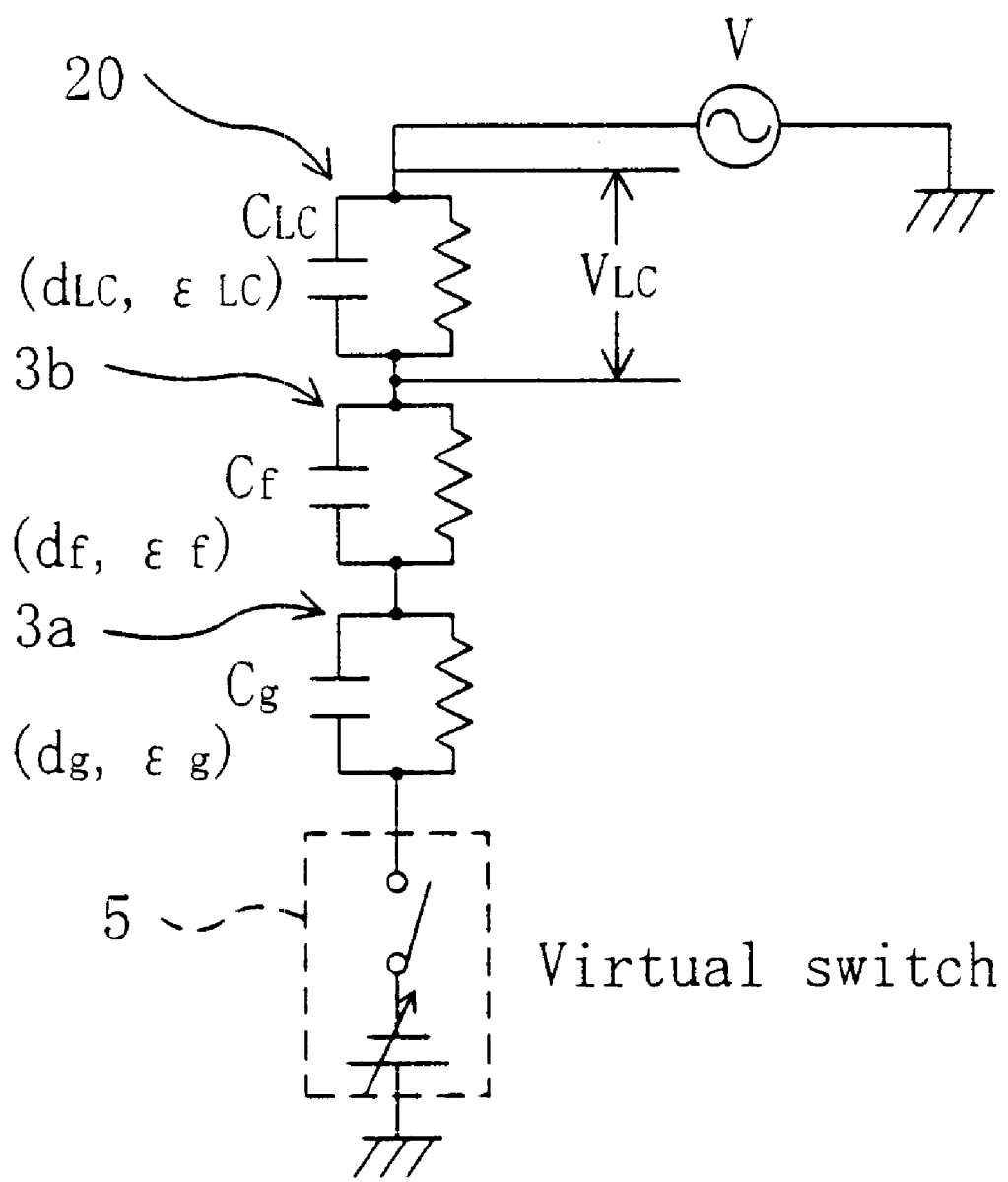
FIG. 7 is an equivalent circuit diagram of the plasma addressed LCD device of FIG. 1B.

FIG. 7 shows an equivalent circuit of the plasma addressed LCD device 100B of FIG. 1B. From FIG. 7, it is found that the voltage $V_{LC}$ applied across the liquid crystal layer 20 is represented by expression (1) below.

$$V_{LC}=V/\{1+\in_{LC}/d_{LC}\times(d_g/\in_g+d_f/\in_f)\} \quad (1)$$

where V denotes the voltage applied across the entire of the liquid crystal layer 20, the dielectric sheet 3a, and the ultraviolet-blocking layer 3b, $\in_{LC}$ and $d_{LC}$ denote the dielectric constant (electric field direction) and the thickness, respectively, of the liquid crystal layer 20, $\in_g$ and $d_g$ denote the dielectric constant and the thickness, respectively, of the dielectric sheet 3a, and $\in_f$ and $d_f$ denote the dielectric constant and the thickness, respectively, of the ultraviolet-blocking layer 3b.

Typically, the dielectric constant $\in_{LC}$ and the thickness $d_{LC}$ of the liquid crystal layer 20 vary in the range of 1 to 5 and in the range of 4 to 8 μm, respectively. The dielectric constant $\in_g$ and the thickness $d_g$ of the dielectric sheet 3a vary in the range of 3 to 9 and in the range of 30 to 80 μm, respectively. If the voltage $V_{LC}$ applied across the liquid crystal layer 20 decreases to a value less than 95% of that obtained when the ultraviolet-blocking layer 3b is not formed, the display brightness and the contrast ratio decrease so great as to be visually recognized. Accordingly, in order to secure the voltage $V_{LC}$ of 95% or more of the voltage applied across the liquid crystal layer 20 when the ultraviolet-blocking layer 3b is not formed, $Z_f$ is preferably 20% or less of $Z_g$ where $Z_f$ is $d_f/\in_f$ and $Z_g$ is $d_g/\in_g$.

From expression (1), also, it is found that the voltage $V_{LC}$ can be increased by increasing the dielectric constant $\in_f$ of the ultraviolet-blocking layer 3b and decreasing the thickness $d_f$ of the ultraviolet-blocking layer 3b. When a glass sheet having a thickness of about 100 μm or less is used as the dielectric sheet 3a, the dielectric constant $\in_f$ of the ultraviolet-blocking layer 3b is preferably in the range of about 2 to about 8, and the thickness $d_f$ of the ultraviolet-blocking layer 3b is preferably 3 μm or less.

The alignment layers 16 and 18 of the LCD device 100A, 100B of the first embodiment of the invention are formed of a polyimide material or a polyamide acid material. Specifically, in the vertical orientation mode, used is a vertical alignment film material such as JALS-204 (manufactured by JSR). In the horizontal orientation mode, used is a horizontal alignment film material such as SE7792 (manufactured by Nissan Chemical Industries, Ltd.).

Hereinafter, a specific construction and formation method of the alignment film 26 of the LCD device 200 of the second embodiment of the invention will be described.

The alignment layer 26 of the LCD device 200 has the property of selectively attenuating ultraviolet rays emitted from the plasma channels 5. The transmittance for ultraviolet rays in the wavelength range of 340 nm or less is less than 70%. Typically, as shown in FIG. 2, the alignment layer 26 is formed on the dielectric layer 23. The dielectric layer 23 of the LCD device 200 of the second embodiment transmits ultraviolet rays and is typically formed of a glass sheet. Otherwise, it may be the dielectric layer 3 of the LCD device 100A, 100B of FIGS. 1A, 1B that selectively attenuates ultraviolet rays emitted from the plasma channels 5.

In general, many kinds of polymer materials are used as the alignment film material forming the alignment layers 24 and 26 of the plasma addressed LCD device. By adding to the polymer material (or a polymerizable precursor thereof in some cases) inorganic and/or organic materials having the property of attenuating (absorbing or scattering) ultraviolet rays in the wavelength range of 340 nm or less, it is possible to form the alignment film 26 that selectively attenuates ultraviolet rays emitted in the plasma channels 5 and transmits ultraviolet rays including i-line. This makes it possible to use ultraviolet rays including i-line during aligning processing because they pass through the alignment film 26.

Examples of the organic polymer material as the alignment film material include polyimide-type resins such as polyimide resin, polyester imide resin, polyether imide resin, and polyamide imide resin, polyamide resins, polystyrene resins, polyurethane resins, epoxyacrylate resins, and resins including any of these resins as a major ingredient. The polyimide-type resins also include polyamide acid resin as a polyimide precursor, partially imidized polyamide acid resin, polyisoimide resin, and a copolymer thereof. The polyimide resin is produced by reacting a tetracarboxylic acid dianhydride (including a derivative thereof) and a diamine compound (including a derivative thereof). Further, an inorganic material may be added to the organic polymer material described above as required. Examples of the inorganic material include polyorganosilane materials and polyorganosilane precursors such as polymerizable silane compounds.

The fillers for ultraviolet blocking described above may be used as the inorganic material that selectively attenuates (absorbs or scatters) ultraviolet rays emitted from the plasma cell 2C (in particular, ultraviolet rays in the short wavelength range of 340 nm or less). Specific examples include inorganic particulates of titanium oxide, cerium oxide, zirconium oxide, ferric oxide, cobalt oxide, zinc oxide, aluminum oxide, silicon dioxide, ferric hydroxide, aluminum hydroxide, and the like. These fillers for ultraviolet blocking may be used singularly, as mixtures, or as complexes as described above. These fillers for ultraviolet blocking may not be in the form of particulates, but may be in the form of whiskers, fibers, flakes, and the like.

The average particle size of the filler for ultraviolet blocking is about 2 nm to about 100 nm, preferably about 10 nm to about 50 nm when the filler is inorganic particulates, for example. The concentration of the filler for ultraviolet blocking is preferably about 3 wt. % or more in order to ensure sufficient ultraviolet blocking. Also, it is preferably about 45 wt. % or less in order to prevent aggregation or increase in viscosity of the filler for ultraviolet blocking. The concentration is more preferably in the range of about 5 wt. % to about 35 wt. %.

The filler for ultraviolet blocking is selected from inorganic materials such as titanium oxide mentioned above based on the wavelength of ultraviolet rays to be attenuated and the wavelength of ultraviolet rays to be transmitted. Since a compound constituting the filler for ultraviolet blocking has different band gaps, it is possible to provide a desired ultraviolet blocking property and a desired ultraviolet transmitting property. The filler for ultraviolet blocking can attenuate ultraviolet rays not only by absorbing ultraviolet rays having a specific wavelength but also by scattering ultraviolet rays. In general, shorter wavelength ultraviolet rays are more easily scattered. The degree of scattering also depends on the particle size and the density of the filler for ultraviolet blocking. Therefore, the filler for ultraviolet blocking may be appropriately optimized according to the ultraviolet blocking property (ultraviolet transmitting property and visible light transmitting property) required.

For regulating the viscosity, the curing rate, and the like of the polymer material, inorganic materials (inorganic particulates or complex inorganic particulates) may be added as required. Examples of the inorganic materials include metals, alloys, metal oxides, metal hydroxides, metal carbides, metal nitride, and complexes thereof, as well as inorganic pigments, and water-insoluble pigments. These inorganic materials may be added to the polymer material, not only in the form of particulates, but also in the whiskers, fibers, flakes, and the like. The average particle size of the inorganic materials is about 2 nm to about 100 nm, preferably about 10 nm to about 50 nm when the inorganic material is inorganic particulates, for example.

As the organic material that selectively attenuates (absorbs) ultraviolet rays emitted from-the plasma cell 2C, the ultraviolet absorbent and the photostabilizer described above are preferably added to the polymer material as the alignment film material. The resin (polymer material), the ultraviolet absorbent, and the photostabilizer are solved or dispersed in a solvent to prepare a mixed solution or a dispersion solution. The resultant mixed or dispersion solution is applied to the dielectric layer 23 by a known method, and dried or cured as required, to form the alignment layer 26. The photostabilizer is preferably used together with the ultraviolet absorber.

The alignment layer 26 may further include other additives such as a quenching agent and a peroxide decomposing agent.

The alignment layer 26 is formed by a known method such as spin coating, spraying, printing, evaporation, or dipping, for example. An appropriate method may be selected from these methods depending on the material. The alignment layer 26 may also be subjected to aligning such as rubbing or subjected to aligning processing using ultraviolet radiation, as required.

The other alignment layer 24 may have or may not have the property of selectively attenuating ultraviolet rays emitted from the plasma channels 5. The alignment layer provided with no such property can be formed by a known method without adding the inorganic and/or organic material to the alignment film material.

Since the alignment layer 26 is formed on the dielectric layer 23, it influences the voltage retention of the liquid crystal layer 20. A low voltage retention may cause exudation, afterimage, or the like. Therefore, in order to keep high the voltage retention of the liquid crystal layer 20, the current flowing to the liquid crystal layer 20 must be as small as possible. This can be done by increasing the volume resistivity of the alignment layer 26 that is in contact with the liquid crystal material. In normal, the volume resistivity of the liquid crystal material is $1 \times 10^{12} \Omega \cdot cm$ or more. The alignment layer therefore preferably has a volume resistivity greater than this value, more preferably $5 \times 10^{12} \Omega \cdot cm$ or more, further more preferably $2 \times 10^{14} \Omega \cdot cm$ or more as will be described in examples below.

Hereinafter, examples of the LCD device of the first embodiment of the invention will be described together with comparative examples. It should be noted that the present invention is not limited to these examples.

In Examples 1 to 6 below, the LCD devices 100A and 100B of FIGS. 1A and 1B were fabricated. LCD devices including dielectric layers different from those of Examples 1 to 6 are also shown as Comparative Examples 1 to 5. The thickness of the liquid crystal layer was set at about 6 μm. As the liquid crystal material, used was MLC-6609 (manufactured by Merck & Co., Inc., Δn=0.077, Δ∈=−3.7) having negative dielectric anisotropy. As the alignment layers, used were vertical alignment layers made of JALS-204 (manufactured by JSR) (thickness: about 0.1 to about 0.3 μm). An acrylate photopolymerizable resin was used as the ultravioletcurable resin for stabilizing the alignment, to which a photoinitiator having absorption for the i-line (wavelength: 365 nm) was added. The wall structure was formed of CSP-S002 (Fuji Film Olin Co., Ltd.) (thickness: about 2 μm). Examples 1 to 6 and Comparative Examples 1 to 5 have the same construction except that the dielectric layers are different from one another.

Table 1 shows the evaluation results of the LCD devices of Examples 2 to 5 and Comparative Examples 1 to 5 as for the ultraviolet transmittance (340 nm and 365 nm), the 310 nm or less ultraviolet cut rate (percentage of [total of intensity of 310 nm or less ultraviolet rays–total of transmission intensity of 310 nm or less ultraviolet rays] to the total of intensity of 310 nm or less ultraviolet rays), $Z_f/Z_g$ (%), the thickness of the ultraviolet-blocking layer (μm), the post-aging voltage retention, the post-aging appearance change of a liquid crystal panel, and the display brightness of the panel. As the aging, 3000 hour continuous plasma driving was performed at 40° C. The voltage retention was evaluated at the aging times of initial (0 hour), 1000 hours, and 3000 hours.

Afterimage was not evaluated in the examination of the post-aging appearance. It is however presumed that afterimage will be generated less easily in a plasma addressed LCD device having small reduction in voltage retention. The reason is that reduction in voltage retention is not only directly related to generation of exudation but also related to generation of afterimage.

EXAMPLE 1

A material of ultrafine titanium oxide powder coated with zirconia and alumina was mixed with a molten glass ingredient, and the mixed material was redrawn (downdrawn) to produce a dielectric sheet (average thickness: about 70 μm) having the property of selectively attenuating ultraviolet rays in a specific wavelength range. The dielectric sheet was used as the dielectric layer 3 (FIG. 1A).

The dielectric sheet of Example 1 is thicker than a dielectric sheet of Example 2 to follow by about 40%. Therefore, while the 310 nm or less ultraviolet cut rate of this example is somewhat larger (about 98.5%), it is less easy to apply a voltage to the liquid crystal layer, compared with Example 2. This necessitates increase of the applied voltage during display.

EXAMPLE 2

The dielectric sheet of Example 1 was immersed in a chemical abrasive solution (solution of hydrofluoric acid, buffered hydrofluoric acid, or the like containing a pH controller, a viscosity controller, and the like) for etching abrasion, to obtain a dielectric sheet of an average thickness of about 50 μm. This dielectric sheet was used as the dielectric layer 3 (FIG. 1A). The surface of the dielectric sheet 3 of this example was observed with an electron microscope and found that smoothness was improved by the chemical abrasion. The improvement in smoothness of the dielectric sheet 3 can prevent the dielectric sheet 3 from cracking during bonding of substrates and also reduce inconsistencies in orientation in the liquid crystal layer 20 (inconsistencies in display) due to roughness of the dielectric sheet 3.

EXAMPLE 3

Used was a dispersion solution (manufactured by Ishihara Sangyo Kaisha, Ltd) including: an inorganic filler composed of a complex of ultrafine titanium oxide particulates and zirconium oxide particulates; and a polyorganosilane precursor matrix material. The dispersion solution was applied to the conventional glass sheet 3a having a thickness of about 50 μm by spin coating, and baked, to obtain the ultraviolet-blocking layer 3b having a thickness of 0.8 μm. This was used as the dielectric layer 3 (FIG. 1B).

Figure 8:
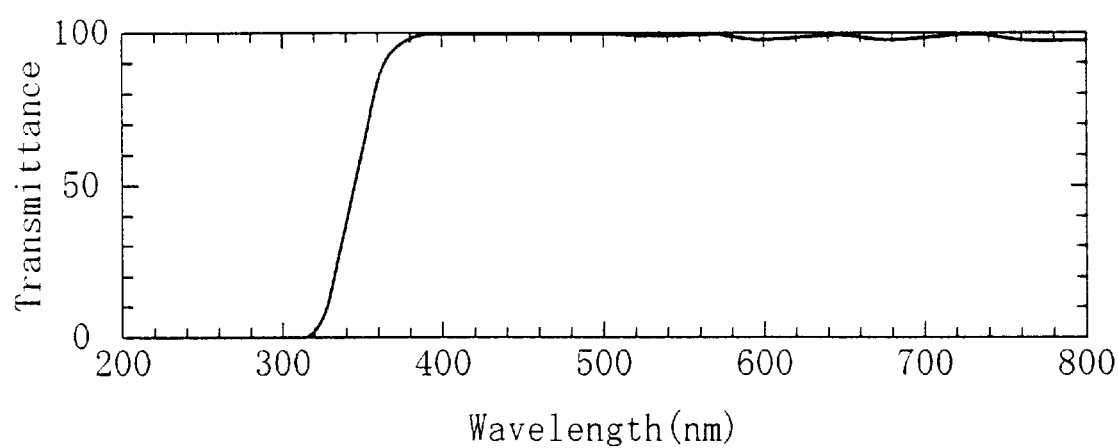
FIG. 8 is a graph showing the optical properties of a dielectric layer formed in Example 3.

FIG. 8 is a graph exemplifying the optical characteristics of the dielectric layer 3 in this example. As is observed from FIG. 8, the ultraviolet transmittance is about 43% or less for the wavelength of 340 nm or less, and about 85% or more for the wavelength of 365 nm or more. The transmittance for visible light substantially exceeds 99%.

Figure 9:
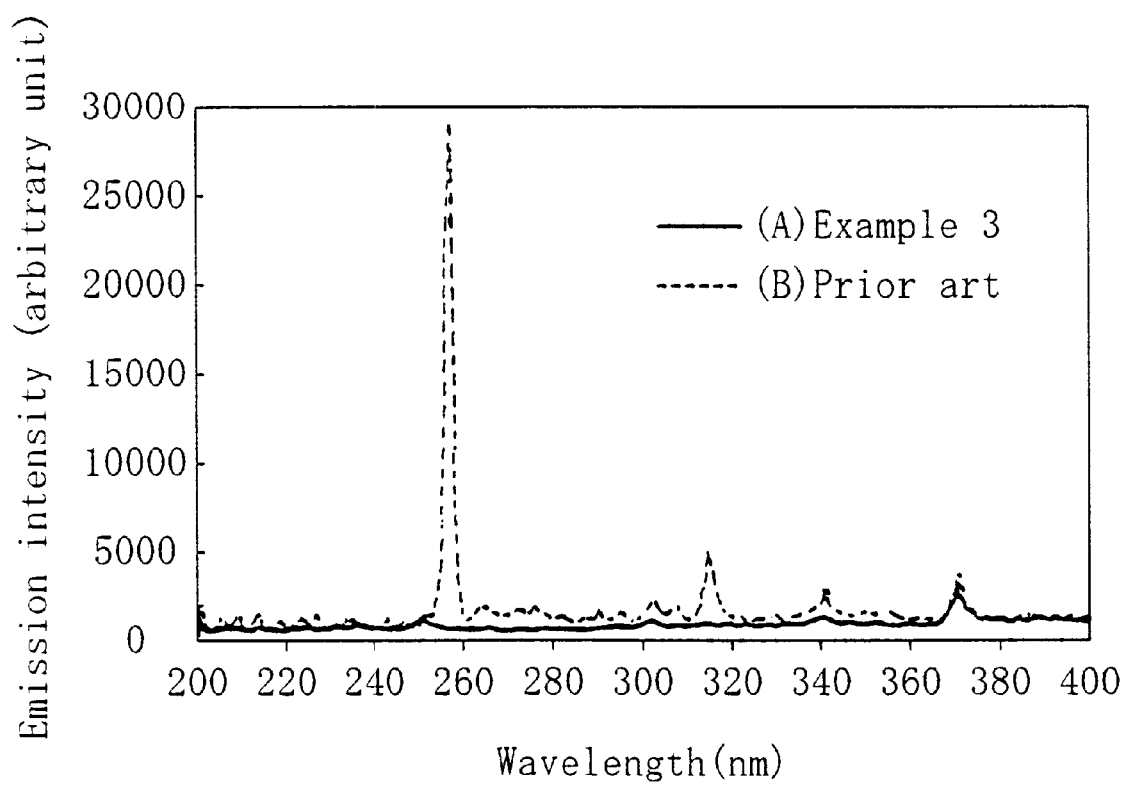
FIG. 9 is a graph showing the emission spectrum of a plasma cell in Example 3 produced using Xe—Hg gas as discharge gas.

FIG. 9 shows an emission spectrum from the plasma cell 2B including the ultraviolet-blocking layer 3b in this example (solid line A), together with an emission spectrum from the conventional plasma cell that does not include the ultraviolet-blocking layer 3b (broken line B). As is observed from FIG. 9, ultraviolet rays in the wavelength range of 340 nm or less (in particular, emission lines near 315 nm and near 257 nm) are strongly output from the conventional plasma cell. On the contrary, the 340 nm or less ultraviolet rays are hardly output from the plasma cell 2B in Example 3. Furthermore, ultraviolet rays having wavelengths of 365 nm and more are output from the plasma cell 2B at substantially the same intensity as that of the ultraviolet rays from the conventional plasma cell. This indicates that the ultraviolet-blocking layer 3b selectively attenuates ultraviolet rays emitted from the plasma cell 2B.

EXAMPLE 4

Used was a dispersion solution (manufactured by Ishihara Sangyo Kaisha, Ltd.) including: an inorganic-organic hybrid matrix material obtained by adding a reactive organic monomer to an organosilane derivative; and cerium oxide complex particulates. The dispersion solution was applied to the conventional glass sheet 3a having a thickness of about 50 μm by spin coating, and baked, to obtain the ultraviolet-blocking layer 3b having a thickness of 1.2 μm. This was used as the dielectric layer 3 (FIG. 1B).

EXAMPLE 5

An organic paint (mixed solution) for ultraviolet blocking, UV11 (manufactured by Ciba Geigy Corp.) was used, which includes an anilide oxalate ultraviolet absorbent and a photostabilizer having a piperidine ring structure. The organic paint was applied to the conventional glass sheet 3a having a thickness of about 50 μm by spin coating, and baked, to obtain the ultraviolet-blocking layer 3b having a thickness of 2.5 μm. This was used as the dielectric layer 3 (FIG. 1B).

As shown in Table 1, the dielectric layers 3 in Examples 2 to 5 selectively attenuated ultraviolet rays in the wavelength range of 340 nm or less to a level of 70% or less, and yet transmitted 80% or more of 365 nm ultraviolet rays.

It is therefore possible to fabricate an ASM mode plasma addressed LCD device where axially symmetrical orientation is stabilized by i-line radiation as in the conventional manner. In addition, reduction in post-aging voltage retention was hardly observed (99.9% or more). No generation of exudation was observed. It is therefore found that the plasma addressed LCD device of the invention successfully suppresses deterioration in display quality due to ultraviolet rays emitted from the plasma cell 2A, 2B.

EXAMPLE 6

Used was a dispersion solution (manufactured by Ishihara Sangyo Kaisha, Ltd) including: an inorganic filler composed of a complex of ultrafine titanium oxide particulates and zirconium oxide particulates; and a polyorganosilane precursor matrix material. The dispersion solution was applied to the conventional glass sheet 3a having a thickness of about 50 μm by spin coating, and baked, to obtain the ultraviolet-blocking layer 3b. Then, a dispersion solution (manufactured by Ishihara Sangyo Kaisha, Ltd) including colloidal silica dispersed together with a polyorganosilane precursor matrix material was applied to the ultraviolet-blocking layer 3b by spin coating and baked, to obtain a protection layer (thickness: about 0.1 μm). The surface of the protection layer was observed with an electron microscope, and it was confirmed that formation of the protection layer was effective for improvement in smoothness and against generation of fine cracks. Other properties were found substantially the same as those of the plasma addressed LCD device of Example 5.

Compartive Example 1

A conventional glass sheet having a thickness of about 50 μm was used as the dielectric layer. The resultant plasma addressed LCD device exhibited decrease in post-aging voltage retention and generation of exudation.

Comparative Example 2

Used was a dispersion solution (manufactured by Ishihara Sangyo Kaisha, Ltd) including: an inorganic filler composed of a complex of ultrafine titanium oxide particulates and zinc oxide particulates; and a polyorganosilane precursor matrix material. The dispersion solution was applied to a conventional glass sheet having a thickness of about 50 μm by spin coating, and baked, to obtain an ultraviolet-blocking layer. This was used as the dielectric layer.

The resultant dielectric layer greatly attenuated ultraviolet rays in the long wavelength range including i-line. The transmittance for the i-line was about 30%. It was therefore confirmed that the i-line radiation time four times as long as that normally required was necessary for stabilizing axially symmetrical orientation.

Comparative Example 3

A dispersion solution (manufactured by Ishihara Sangyo Kaisha, Ltd) where an inorganic filler composed of ultrafine titanium oxide particulates was dispersed in a polyorganosilane precursor matrix was used. The dispersion solution was applied to a conventional glass sheet having a thickness of about 50 μm by spin coating, and baked, to obtain an ultraviolet-blocking layer having a thickness of 0.7 μm. This was used as the dielectric layer.

The ultraviolet cut rate of the resultant dielectric layer for the wavelength range of 320 nm or less was about 83%. In particular, the ultraviolet cut rate for the wavelength range of 300 nm or less was low. This caused reduction in voltage retention and generation of exudation by aging. This indicates that the ultraviolet-blocking layer in this comparative example fails to sufficiently suppress deterioration in display quality due to ultraviolet radiation.

Comparative Example 4

The dielectric layer in this comparative example was formed in the same manner as that described in Example 4, except that the thickness $d_f$ of the ultraviolet-blocking layer was 2.9 μm and $Z_f/Z_g(\%)$ was 21.3.

Comparative Example 5

The dielectric layer in this comparative example was formed in the same manner as that described in Example 3, except that the thickness $d_f$ of the ultraviolet-blocking layer was 3.5 μm and $Z_f/Z_g(\%)$ was 21.8.

Since the LCD devices of Comparative Examples 4 and 5 include the dielectric layer selectively blocking ultraviolet rays, improvement in reliability in plasma aging was confirmed. However, due to the excessively thick dielectric layer, the voltage applied across the liquid crystal layer decreased (in particular, decreased by 10% or more in Comparative Example 5). Reduction in display brightness and contrast ratio was observed. To secure standard brightness and contrast ratio, therefore, it is necessary to enhance the brightness or driving voltage of a backlight. This causes problems such as increase in power consumption and increase in load to a drive circuit.

TABLE 1

| Example No. | UV transmittance (%) 340 nm | UV transmittance (%) 365 nm | ≦310 nm cut rate (%) | Zf/Zg (%) | Thickness of UV-blocking layer df (μm) | Post-aging voltage retention (%) 0 h | Post-aging voltage retention (%) 1000 h | Post-aging voltage retention (%) 3000 h | Post-aging panel appearance change | Remarks |
|---|---|---|---|---|---|---|---|---|---|---|
| Example 2 | 65 | 90 | 97.0 | — | — | 100 | 100 | 100 | Non | ○ |
| Example 3 | 43 | 85 | 99.4 | 0.9 | 0.8 | 100 | 100 | 100 | Non | ○ |
| Example 4 | 70 | 95 | 98.2 | 3.4 | 1.2 | 100 | 100 | 100 | Non | ○ |
| Example 5 | 50 | 83 | 98.4 | 18.4 | 2.5 | 100 | 100 | 99.9 | Non | ○ 1) |
| Comparative Example 1 | 78 | 97 | 43.0 | — | — | 100 | 91 | 82.1 | Exudation generated | ○ |
| Comparative Example 2 | 22 | 30 | 99.9 | 1.1 | 0.7 | 100 | 100 | 100 | Non | ○ 2) |

TABLE 1-continued

| Example No. | UV transmittance (%) 340 nm | UV transmittance (%) 365 nm | ≦310 nm cut rate (%) | Zf/Zg (%) | Thickness of UV-blocking layer df (μm) | Post-aging voltage retention (%) 0 h | Post-aging voltage retention (%) 1000 h | Post-aging voltage retention (%) 3000 h | Post-aging panel appearance change | Remarks |
|---|---|---|---|---|---|---|---|---|---|---|
| Comparative Example 3 | 72 | 94 | 83.1 | 1.0 | 0.7 | 100 | 96 | 93.5 | Exudation generated | ○ |
| Comparative Example 4 | 40 | 78 | 99.7 | 21.3 | 2.9 | 100 | 100 | 99.8 | Non | X 3) |
| Comparative Example 5 | 35 | 67 | 99.9 | 21.8 | 3.5 | 100 | 100 | 99.9 | Non | X 4) |

○ Within panel brightness specs
X Decreased to below panel brightness specs
1) Panel brightness decreased by 4% (lower limit of specs)
2) Requiring time about 4 times that normally required for stabilizing axially symmetrical orientation
3) Panel brightness decreased by 8%
4) Panel brightness decreased by 10% or more Next, examples of the LCD device of the second embodiment of the invention will be described together with comparative examples. It should be noted that the invention is not limited to these examples. In Examples 7 to 11 below, the LCD device 200 of FIG. 2 was fabricated. LCD devices using alignment layers different from those in Examples 7 to 11 are shown as Comparative Examples 6 to 9.

A glass sheet having a thickness of about 50 μm was used as the dielectric layer. The thickness of the liquid crystal layer was set at about 6 μm. Examples 7 to 11 and Comparative Examples 6 to 9 have the same construction except that the alignment layers are different from one another and that either TN mode or ASM mode is used. As the liquid crystal material, MLC-6609 having negative dielectric anisotropy was used in the case that liquid crystal molecules are axially symmetrically oriented during voltage application (N mode), while ZLI-4792 having positive dielectric anisotropy was used in the case that liquid crystal molecules are axially symmetrically oriented during non-voltage application (P mode). An acrylate photopolymerizable resin was used as the ultraviolet curable resin for stabilizing the orientation in the ASM mode, to which a photoinitiator having absorption for i-line (wavelength: 365 nm) was added. The wall structure in the ASM mode was formed of CSP-S002 (Fuji Film Olin Co., Ltd.) (thickness: about 2 μm).

Table 2 shows the evaluation results of the LCD devices of Examples 7 to 11 and Comparative Examples 6, 7, and 9 for the ultraviolet transmittance (320 nm, 340 nm, and 365 nm), the volume resistivity, the post-aging voltage retention, and the post-aging appearance change of the liquid crystal panel, and the display quality of the panel as well as the display mode. As the aging, 3000 hour continuous plasma driving was performed at 40° C. The voltage retention was evaluated at the aging times of initial (0 hour), 1000 hours, and 3000 hours.

EXAMPLE 7

A dispersion solution was prepared by dispersing an inorganic filler composed of a complex of ultrafine titanium oxide particulates and zirconium oxide particulates in a polyamide acid solution obtained by reacting a tetracarboxylic acid dianhydride and a diamine compound. The dispersion solution was applied to a glass sheet by spin coating and baked, to form the alignment layer 26 (thickness: about 0.2 μm). After rubbing and scattering of spacer beads, the plasma cell 2C was bonded together with the counter substrate 8, to complete the TN mode plasma addressed LCD device.

EXAMPLE 8

A dispersion solution was prepared by dispersing an inorganic filler composed of a complex of ultrafine titanium oxide particulates and zirconium oxide particulates in a polyamide acid solution obtained by reacting a tetracarboxylic acid dianhydride and a diamine compound. The dispersion solution was applied to a glass sheet by spin coating and baked, to form the alignment layer 26 (thickness: about 0.3 μm). Using this alignment layer, an ASM mode plasma addressed LCD device was fabricated.

Figure 10:
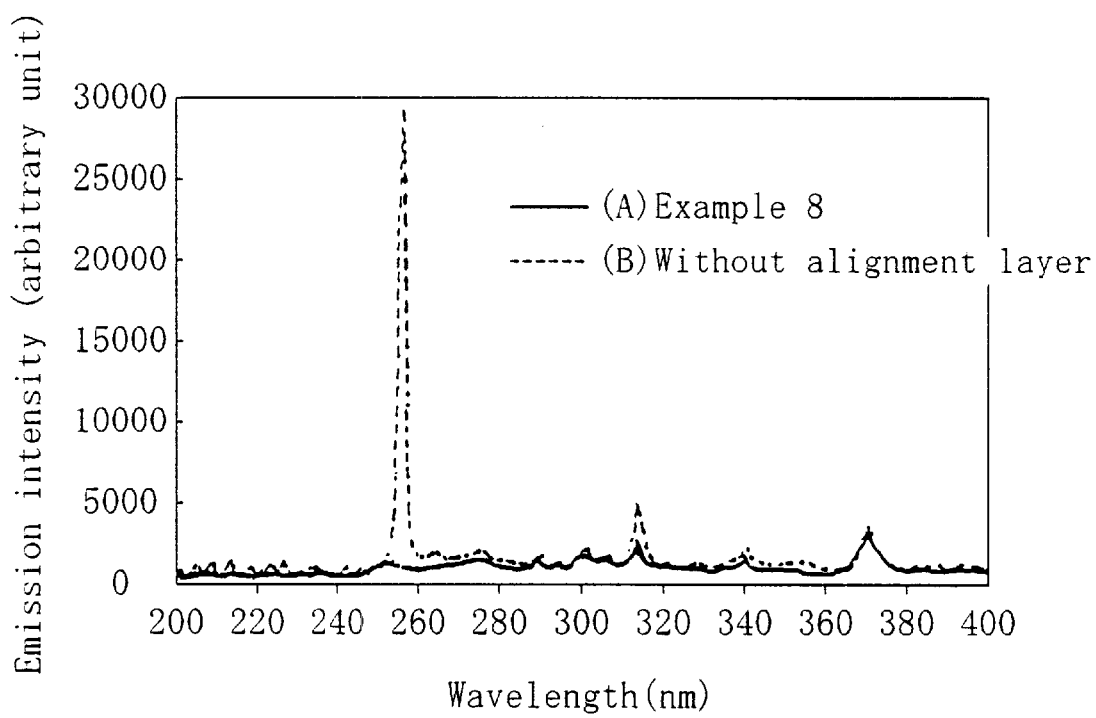
FIG. 10 is a graph showing the emission spectrum of a plasma cell in Example 8 produced using Xe—Hg gas as discharge gas.

FIG. 10 shows an emission spectrum from the plasma cell on which the alignment layer 26 is formed in this example (solid line A), together with an emission spectrum from a plasma cell that does not include the alignment layer (broken line B). As is observed from FIG. 10, ultraviolet rays in the wavelength range of 340 nm or less (in particular, emission lines near 315 nm and near 257 nm) are strongly output from the conventional plasma cell. On the contrary, ultraviolet rays in the wavelength range of 340 nm or less are hardly output from the plasma cell of Example 8. Furthermore, ultraviolet rays in the wavelength range of 365 nm or more are output from the plasma cell 2B at substantially the same intensity as that of the ultraviolet rays from the plasma cell having no alignment layer. This indicates that the alignment layer 26 selectively attenuates ultraviolet rays emitted from the plasma cell.

EXAMPLE 9

The alignment film 26 (thickness: about 0.3 μm) was formed in the same manner as that described in Example 8 except that an inorganic filler composed of cerium oxide complex particulates ($CeO_2$, manufactured by Nihon Muki Kagaku Kogyo Co., Ltd.) was used, to complete an ASM mode plasma addressed LCD device.

EXAMPLE 10

The alignment film 26 (thickness: about 0.4 μm) was formed in the same manner as that described in Example 8 except that an anilide oxalate ultraviolet absorbent (manufactured by Ciba Geigy Corp.) and a photostabilizer having a piperidine ring structure (manufactured by Ciba Geigy Corp.) were used, to complete an ASM mode plasma addressed LCD device.

The alignment layers 26 in Examples 8 to 10 selectively attenuated ultraviolet rays in the wavelength range of 340 nm or less to a level of less than 70% (64% or less), and yet transmitted 80% or more of 365 nm ultraviolet rays. It is therefore possible to fabricate an ASM mode plasma addressed LCD device where axially symmetrical orientation is stabilized by i-line radiation as in the conventional manner. The alignment layers 26 can attenuate ultraviolet rays in the wavelength range of 320 nm or less to a level of 40% or less (35% or less), and although not shown in Table 2, can attenuate ultraviolet rays in the wavelength range of 310 nm or less to a level of 10% or less. In addition, reduction in post-aging voltage retention was hardly observed (99.8% or more). No generation of exudation was observed. It is therefore found that the plasma addressed LCD device of the invention suppresses deterioration in display quality due to ultraviolet rays emitted from the plasma cell 2C.

EXAMPLE 11

The dispersion solution used in Example 7 was applied to a glass sheet by printing and baked, to obtain the alignment layer 26 (thickness: about 0.25 μm). Then, after alignment of a photomask, ultraviolet rays were radiated at an energy of 3 J/cm$^2$ in terms of 254 nm with a low-pressure mercury-vapor lamp (ULI-1DQ manufactured by Ushio Inc.) to perform pixel division. After rubbing and scattering of spacer beads, the plasma cell 2C was bonded together with the counter substrate 8, to complete the TN mode plasma addressed LCD device. In the thus-fabricated LCD device, the pretilt angle of the ultraviolet-irradiated portions of the alignment layer 26 is smaller than that of the non-irradiated portions, indicating that the LCD device has wide viewing angle characteristics.

The alignment layers 26 in Examples 7 and 11 selectively attenuated ultraviolet rays in the wavelength range of 340 nm or less to a level of less than 70% (48% or less), and yet transmitted 80% or more of 365 nm ultraviolet rays. The invention is therefore found applicable to aligning techniques using radiation of i-line and the like. The alignment layers 26 can attenuate ultraviolet rays in the wavelength range of 320 nm or less to a level of 40% or less (19% or less), and although not shown in Table 2, can attenuate ultraviolet rays in the wavelength range of 310 nm or less to a level of 10% or less. In addition, as is found from the results shown in Table 2, the initial voltage retention (at aging 0 hour) is 100% for the alignment layer 26 in Example 11. This indicates that deterioration in display quality due to ultraviolet radiation during aligning processing is suppressed.

Comparative Example 6

A conventional alignment film (thickness: about 0.1 μm) without the ultraviolet blocking property was formed, and a TN mode plasma addressed LCD device was formed in the manner described in Example 7.

Comparative Example 7

A conventional alignment film (thickness: about 0.15 μm) without the ultraviolet blocking property was formed, and a ASM mode plasma addressed LCD device was formed in the manner described in Example 8.

In Comparative Examples 6 and 7, the ultraviolet transmittance for the wavelength of 340 nm is 70%, which is high compared with the transmittances, 42% to 64%, of the alignment layers in Examples 7 to 11. The ultraviolet transmittance for the wavelength of 320 nm is 43%, which is high compared with the transmittances, 17% to 35%, in Examples 7 to 11. Although not shown in Table 2, the ultraviolet transmittance for a wavelength of 310 nm or less exceeds 10%. The resultant plasma addressed LCD devices in Comparative Examples 6 and 7 exhibited decrease in voltage retention and generation of exudation by aging.

Comparative Example 8

The alignment film (thickness: about 0.2 μm) was formed in the same manner as that described in Example 7 except that an inorganic filler composed of complex particulates of ultrafine titanium oxide, zirconium oxide, and aluminum oxide was used, to fabricate an ASM mode plasma addressed LCD device.

The volume resistivity of the alignment layers 26 in Examples 7 to 11 were $2 \times 10^{14} \Omega \cdot cm$ or more, while that of the alignment layer in this comparative example was $3 \times 10^{12} \Omega \cdot cm$ or more. In this comparative example, therefore, the voltage retention of the liquid crystal layer decreased. After aging, decrease in voltage retention and generation of exudation were observed. This indicates that when the volume resistivity is low, deterioration in display quality due to ultraviolet rays is eminent.

The LCD device of Comparative Example 8, which included the alignment layer selectively blocking ultraviolet rays, exhibited improvement in reliability in plasma aging. However, due to the low volume resistivity of the alignment layer, the voltage applied across the liquid crystal layer decreased, and as a result, reduction in display brightness and contrast ratio was observed. To secure standard brightness and contrast ratio, it is necessary to enhance the brightness or driving voltage of a backlight. This causes problems such as increase in power consumption and increase in load to a drive circuit.

Comparative Example 9

A pixel-divided TN mode plasma addressed LCD device was fabricated in the same manner as that described in Example 11 except that a conventional alignment layer (thickness: 0.25 μm) without the ultraviolet blocking property was formed.

The initial voltage retention (at aging 0 hour) of the LCD device of Comparative Example 9 was 85% as shown in Table 2, and deterioration in display quality due to ultraviolet radiation during aligning processing was confirmed. The LCD device of this comparative example generated not only exudation but also a significant degree of afterimage after aging. The decrease in voltage retention is not only directly related to generation of exudation, but also related to generation of afterimage. The cause of generation of afterimage is presumably as follows. When the specific resistance of the liquid crystal material or the alignment layer is low, the voltage retention decreases. In this state, residual DC increases caused by minute polarization in the vicinity of the interface between the alignment layer and the liquid crystal layer.

TABLE 2

| Example No. | UV transmittance (%) | | | Volume resistivity | Post-aging voltage retention (%) | | | Post-aging panel appearance change | Remarks |
|---|---|---|---|---|---|---|---|---|---|
| | 320 nm | 340 nm | 365 nm | (Ω · cm) | 0 h | 1000 h | 3000 h | | |
| Example 7 | 17 | 48 | 82 | 3 × 10¹⁵ | 100 | 100 | 100 | Non | Reversal observed TN |
| Example 8 | 17 | 48 | 82 | 3 × 10¹⁵ | 100 | 100 | 100 | Non | Good viewing angle ASM |
| Example 9 | 33 | 57 | 87 | 7 × 10¹⁴ | 100 | 100 | 100 | Non | Good viewing angle ASM |
| Example 10 | 35 | 64 | 85 | 2 × 10¹⁴ | 100 | 100 | 99.8 | Non | Good viewing angle ASM |
| Example 11 | 19 | 42 | 82 | 4 × 10¹⁵ | 100 | 99.7 | 99.5 | Non | Pixel division TN |
| Comparative Example 6 | 43 | 70 | 88 | 1 × 10¹⁶ 以上 | 100 | 93 | 84 | Exudation generated | Reversal observed TN |
| Comparative Example 7 | 43 | 70 | 88 | 1 × 10¹⁶ 以上 | 100 | 90 | 81 | Exudation generated | Good viewing angle ASM |
| Comparative Example 9 | 45 | 72 | 89 | 1 × 10¹⁶ 以上 | 85 | 74 | 62 | exudation markedly generated Afterimage markedly generated | Pixel division TN |

Thus, the present invention can provide a plasma addressed LCD device having wide viewing angle characteristics that can suppress or prevent deterioration in display quality due to ultraviolet rays from plasma channels and also can perform aligning processing using ultraviolet rays in a specific wavelength band, and a method for fabricating the plasma addressed LCD device. In particular, long-time driving reliability of the ASM mode plasma addressed LCD device is improved.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display device comprising:

a substrate;

a dielectric layer;

a liquid crystal layer sandwiched by the substrate and the dielectric layer;

a plurality of stripe-shaped electrodes formed on a surface of the substrate facing the liquid crystal layer to extend in parallel with a first direction; and a plurality of stripe-shaped plasma channels formed to face the plurality of electrodes with the liquid crystal layer and the dielectric lay therebetween to extend in parallel with a second direction different from the first direction, a plurality of pixel regions being formed at respective crossings of the plurality of electrodes and the plurality of plasma channels, wherein the dielectric layer selectively attenuates ultraviolet rays emitted from the plurality of plasma channels, wherein an ultraviolet transmittance of the dielectric layer is 70% or less for a wavelength range of 340 nm or less and 80% or more fork wavelength of 365 nm.

2. The liquid crystal display device of claim 1, wherein the dielectric layer is formed of a single dielectric sheet having a property of selectively attenuating the ultraviolet rays.

3. The liquid crystal display device of claim 1, wherein the dielectric layer includes a dielectric sheet transmitting the ultraviolet rays and an ultraviolet-blocking layer formed on at least one surface of the dielectric sheet, and the ultraviolet-blocking layer has a property of selectively attenuating the ultraviolet rays.

4. The liquid crystal display device of claim 3, wherein the ultraviolet-blocking layer includes inorganic particulates that attenuate the ultraviolet rays.

5. The liquid crystal display device of claim 3, wherein the ultraviolet-blocking layer includes an ultraviolet absorbent and a photostabilizer.

6. The liquid crystal display device of claim 3, wherein $Z_f$ is 20% or less of $Z_g$ when $Z_f$ is $d_f/\epsilon_f$ and $Z_g$ is $d_g/\epsilon_g$ where $d_f$ and $\epsilon_f$ are the thickness and the dielectric constant of the ultraviolet-blocking layer, and $d_g$ and $\epsilon_g$ are the thickness and the dielectric constant of the dielectric sheet.

7. The liquid crystal display device of claim 6, wherein the thickness of the ultraviolet-blocking layer $d_f$ is 3 µm or less.

8. The liquid crystal display device of claim 1, wherein the liquid crystal layer includes liquid crystal molecules and a cured ultravioletcurable resin, and the initial orientation of the liquid crystal molecules is stabilized by the cured ultravioletcurable resin.

9. The liquid crystal display device of claim 8, further comprising a wall structure on the surface of the substrate facing the liquid crystal layer, the liquid crystal layer is divided into a plurality of liquid crystal regions by the wall structure, and the liquid crystal molecules in the liquid crystal regions are axially symmetrically oriented.

10. A liquid crystal display device comprising:

a substrate;

a dielectric layer;

a liquid crystal layer sandwiched by the substrate and the dielectric layer;

a plurality of stripe-shaped electrodes formed on a surface of the substrate facing the liquid crystal layer to extend in parallel with a first direction; and a plurality of stripe-shaped plasma channels formed to face the plurality of electrodes with the liquid crystal layer and the dielectric layer therebetween to extend in parallel with a second direction different from the first direction, a plurality of pixel regions being formed at respective crossings of the plurality of electrodes and the plurality of plasma channels, wherein the device further comprises a pair of alignment layers formed on both surfaces of the liquid crystal layer, wherein at least the alignment layer formed on the side of the dielectric layer selectively attenuates ultraviolet rays emitted from the plurality of plasma channels, and has an ultraviolet transmittance of less than 70% for a wavelength range of 340 nm or less.

11. The liquid crystal display device of claim 10, wherein the ultraviolet transmittance of the alignment layer is 40% or less for a wavelength of 320 nm and 80% or more for a wavelength of 365 nm.

12. The liquid crystal display device of claim 10, wherein the liquid crystal layer includes liquid crystal molecules and a cured ultravioletcurable resin, and the initial orientation of the liquid crystal molecules is stabilized by the cured ultravioletcurable resin.

13. The liquid crystal display device of claim 12, further comprising a wall structure on the surface of the substrate facing the liquid crystal layer, the liquid crystal layer is divided into a plurality of liquid crystal regions by the wall structure, and the liquid crystal molecules in the liquid crystal regions are axially symmetrically oriented.

14. The liquid crystal display device of claim 10, wherein the alignment layer includes a polymer material and inorganic particulates that attenuate the ultraviolet rays.

15. The liquid crystal display device of claim 10, wherein the alignment layer includes a polymer material and an ultraviolet absorbent.

16. The liquid crystal display device of claim 15, wherein the alignment layer further includes a photostabilizer.

17. The liquid crystal display device of claim 10, wherein the volume resistivity of the alignment layer is $5 \times 10^{12}$ $\Omega \cdot cm$ or more.

18. A method for fabricating a liquid crystal display device, the device comprising:
a substrate;
a dielectric layer;
a liquid crystal layer sandwiched by the substrate and the dielectric layer;
a plurality of stripe-shaped electrodes formed on a surface of the substrate facing the liquid crystal layer to extend in parallel with a first direction; and
a plurality of stripe-shaped plasma channels formed to face the plurality of electrodes with the liquid crystal layer and the dielectric layer therebetween to extend in parallel with a second direction different from the first direction, a plurality of pixel regions being formed in respective crossings of the plurality of electrodes and the plurality of plasma channels, the device further comprising a wall structure on the surface of the substrate facing the liquid crystal layer, the liquid crystal layer being divided into a plurality of liquid crystal regions by the wall structure, the liquid crystal molecules in the liquid crystal regions being axially symmetrically oriented, the method comprising the steps of:

forming the wall structure on the substrate;
preparing the dielectric layer that selectively attenuates ultraviolet rays emitted from the plurality of plasma channels, wherein the ultraviolet transmittance of the dielectric layer is 70% or less for a wavelength range of 340 nm or less and 80% or more for a wavelength of 365 nm;
injecting a material including liquid crystal molecules and an ultravioletcurable resin in a space between the substrate on which the wall structure is formed and the dielectric layer; and
stabilizing initial orientation of the liquid crystal molecules by irradiating the material with ultraviolet rays having a wavelength of 365 nm via the dielectric layer to cure the ultravioletcurable resin.

19. The method of claim 18, wherein the step of preparing the dielectric layer includes the steps of:
preparing a dielectric sheet having a property of selectively attenuating the ultraviolet rays; and
chemically abrading the dielectric sheet.

20. A method for fabricating a liquid crystal display device, the device comprising:
a substrate;
a dielectric layer;
a liquid crystal layer sandwiched by the substrate and the dielectric layer;
a plurality of stripe-shaped electrodes formed on a surface of the substrate facing the liquid crystal layer to extend in parallel with a first direction; and
a plurality of stripe-shaped plasma channels formed to face the plurality of electrodes with the liquid crystal layer and the dielectric layer therebetween to extend in parallel with a second direction different from the first direction, a plurality of pixel regions being formed in respective crossings of the plurality of electrodes and the plurality of plasma channels, the method comprising the steps of:
forming an alignment layer on the dielectric layer, the alignment layer selectively attenuating ultraviolet rays emitted from the plurality of plasma channels and having an ultraviolet transmittance of less than 70% for a wavelength range of 340 nm or less; and
performing aligning processing for the alignment layer.

21. A method for fabricating a liquid crystal display device, the device comprising:
a substrate;
a dielectric layer;
a liquid crystal layer sandwiched by the substrate and the dielectric layer;
a plurality of stripe-shaped electrodes formed on a surface of the substrate facing the liquid crystal layer to extend in parallel with a first direction; and
a plurality of stripe-shaped plasma channel formed to face the plurality of electrodes with the liquid crystal layer and the dielectric layer therebetween to extend in parallel with a second direction different from the first direction, a plurality of pixel regions being formed in respective crossings of the plurality of electrodes and the plurality of plasma channels, the device further comprising a wall structure on the surface of the substrate facing the liquid crystal layer, the liquid crystal layer being divided into a plurality of liquid crystal regions by the wall structure, the liquid crystal molecules in the liquid crystal regions being axially symmetrically oriented,, the method comprising the steps of:

forming the wall structure on the substrate;

forming an alignment layer on the dielectric layer, the alignment layer selectively attenuating ultraviolet rays emitted from the plurality of plasma channels and having an ultraviolet transmittance of less than 70% for a wavelength range of 340 nm or less;

injecting a material including liquid crystal molecules and an ultravioletcurable resin in a space between the dielectric layer on which the alignment layer is formed and substrate on which the wall structure is formed; and stabilizing initial orientation of the liquid crystal molecules by irradiating the material with ultraviolet rays having a wavelength of 365 nm via the dielectric layer to cure the ultravioletcurable resin.

22. A liquid crystal display device comprising:

a substrate;

a dielectric layer;

a liquid crystal layer sandwiched by the substrate and the dielectric layer;

a plurality of stripe-shaped electrodes formed on a surface of the substrate facing the liquid crystal layer to extend in parallel with a first direction; and a plurality of stripe-shaped plasma channels formed to face the plurality of electrodes with the liquid crystal layer and the dielectric layer therebetween to extend in parallel with a second direction different from the first direction, a plurality of pixel regions being formed in respective crossings of the plurality of electrodes and the plurality of plasma channels, wherein the dielectric layer selectively attenuates ultraviolet rays emitted from the plurality of plasma channels, the dielectric layer includes a dielectric sheet transmitting the ultraviolet rays and an ultraviolet-blocking layer formed on at least one surface of the dielectric sheet, the ultraviolet-blocking layer has a property of selectively attenuating the ultraviolet rays, and wherein Zf is 20% or less of Zg when Zf is df/∈f and Zg is dg/∈g where df and ∈f are the thickness and the dielectric constant of the ultraviolet-blocking layer, respectively, and dg and ∈g are the thickness and the dielectric constant of the dielectric sheet, respectively.

23. The method of claim 20, wherein the ultraviolet transmittance of the alignment layer is 40% or less for a wavelength of 320 and 80% or more for a wavelength of 365 nm.

24. The method of claim 21, wherein the ultraviolet transmittance of the alignment layer is 40% or less for wavelength of 320 nm and 80% or more for a wavelength of 365 nm.

* * * * *